(12) United States Patent
Kuroda et al.

(10) Patent No.: US 8,963,504 B2
(45) Date of Patent: Feb. 24, 2015

(54) ELECTRONIC DEVICE, METHOD OF CHARGING ELECTRONIC DEVICE, PROGRAM, CHARGING CONTROL APPARATUS, AND CHARGING CONTROL METHOD

(75) Inventors: Yohei Kuroda, Tokyo (JP); Osamu Ishioka, Chiba (JP); Nobutaka Yagi, Kanagawa (JP); Ryoji Amemiya, Kanagawa (JP); Kenji Waku, Kanagawa (JP)

(73) Assignee: Sony Corporation (JP)

( * ) Notice: Subject to any disclaimer, the term of this patent is extended or adjusted under 35 U.S.C. 154(b) by 67 days.

(21) Appl. No.: 13/388,773

(22) PCT Filed: Aug. 3, 2010

(86) PCT No.: PCT/JP2010/063074
§ 371 (c)(1),
(2), (4) Date: Feb. 3, 2012

(87) PCT Pub. No.: WO2011/018959
PCT Pub. Date: Feb. 17, 2011

(65) Prior Publication Data
US 2012/0126744 A1 May 24, 2012

(30) Foreign Application Priority Data
Aug. 11, 2009 (JP) .................................. 2009-186676

(51) Int. Cl.
*H02J 7/16* (2006.01)
*H02J 7/06* (2006.01)
(Continued)

(52) U.S. Cl.
CPC .............. *H01M 10/44* (2013.01); *H01M 10/48* (2013.01); *H02J 7/041* (2013.01); *H02J 7/042* (2013.01)
USPC ............................ 320/137; 320/157; 320/159

(58) Field of Classification Search
USPC ................................... 320/137, 155, 157–159
See application file for complete search history.

(56) References Cited

U.S. PATENT DOCUMENTS 5,610,499 A * 3/1997 Rogers ............................ 322/25
6,229,285 B1 * 5/2001 Ding ............................. 320/132
(Continued)

FOREIGN PATENT DOCUMENTS

JP 09-261882 10/1997
JP 11146505 A 5/1999
(Continued)

OTHER PUBLICATIONS

International Search Report, PCT/JP2010/063074, dated Nov. 2, 2010.

*Primary Examiner* — Drew A Dunn
*Assistant Examiner* — Steve T Chung
(74) *Attorney, Agent, or Firm* — Lerner, David, Littenberg, Krumholz & Mentlik, LLP

(57) ABSTRACT

Provided is an electronic device including a secondary battery, a charging section which charges the secondary battery with power supplied from an external power supply section with a set charging current, a measurement section which measures an amount of charge accumulated in the secondary battery, a time information acquisition section which acquires time information, a storage section which stores charging history information indicating a time period in which a user performs charging, and a control section which has a chargeable time estimation section that estimates chargeable time based on the charging history information and the time information, and a charging current setting section that calculates a restricted charging current which enables the secondary battery to be charged up to a charging capacity within the chargeable time, based on the amount of charge acquired from the measurement section, and sets the restricted charging current in the charging section.

22 Claims, 16 Drawing Sheets

(51) Int. Cl.
  *H01M 10/44* (2006.01)
  *H01M 10/48* (2006.01)
  *H02J 7/04* (2006.01)

(56) References Cited

U.S. PATENT DOCUMENTS

| | | | | |
|---|---|---|---|---|
| 6,483,272 | B1 * | 11/2002 | Terada et al. | 320/103 |
| 6,700,352 | B1 * | 3/2004 | Elliott et al. | 320/130 |
| 6,928,372 | B2 * | 8/2005 | Pozsgay et al. | 702/63 |
| 7,570,021 | B2 * | 8/2009 | Togashi et al. | 320/130 |
| 7,622,895 | B1 * | 11/2009 | Griffin | 320/132 |
| 7,849,944 | B2 * | 12/2010 | DeVault | 180/65.29 |
| 7,996,098 | B2 * | 8/2011 | Dickinson et al. | 700/80 |
| 8,314,594 | B2 * | 11/2012 | Scott et al. | 320/132 |
| 8,344,685 | B2 * | 1/2013 | Bertness et al. | 320/104 |
| 8,350,521 | B2 * | 1/2013 | Reineccius | 320/101 |

FOREIGN PATENT DOCUMENTS

| | | |
|---|---|---|
| JP | 2004318629 A | 11/2004 |
| JP | 2009022061 A | 1/2009 |
| JP | 2009042877 A | 2/2009 |

* cited by examiner

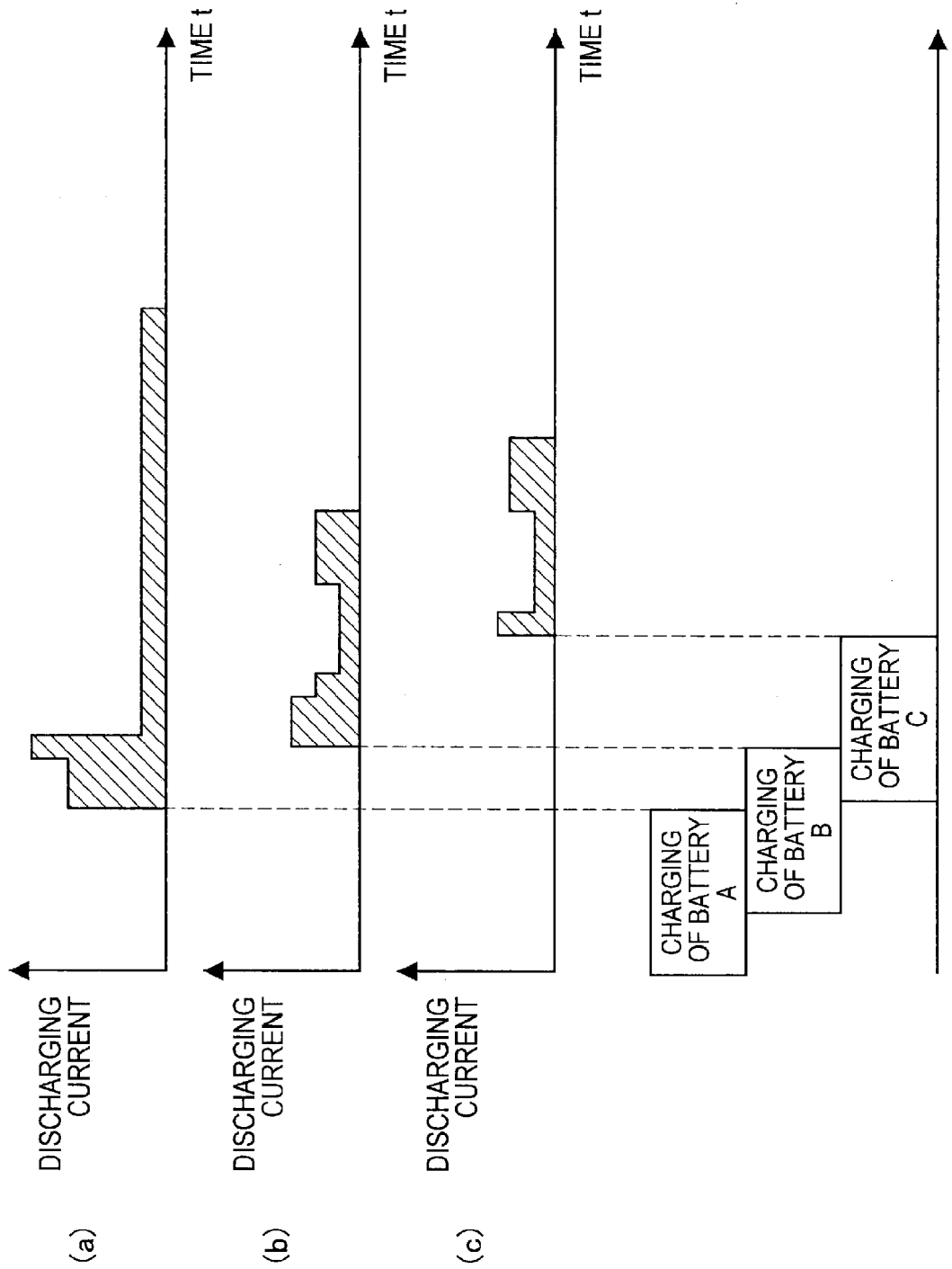

ELECTRONIC DEVICE, METHOD OF CHARGING ELECTRONIC DEVICE, PROGRAM, CHARGING CONTROL APPARATUS, AND CHARGING CONTROL METHOD

CROSS-REFERENCE TO RELATED APPLICATION

The present application is a national phase entry under 35 U.S.C. §371 of International Application No. PCT/JP2010/063074 filed Aug. 3, 2010, published on Feb. 17, 2011 as WO 2011/018959 A1, which claims priority from Japanese Patent Application No. JP 2009-186676 filed in the Japanese Patent Office on Aug. 11, 2009.

TECHNICAL FIELD

The present invention relates to an electronic device, a method of charging an electronic device, a program, a charging control apparatus, and a charging control method, and particularly relates to an electronic device having a secondary battery, a method of charging an electronic device, a program, a charging control apparatus of a secondary battery, and a charging control method of a secondary battery.

BACKGROUND ART

Currently, there are used many electronic devices, such as a mobile phone, a notebook computer, a digital still camera, a digital video camera, and a PDA, which have secondary batteries capable of being charged repeatedly therein. A user charges the secondary battery by connecting an electronic device to a commercial power source. The secondary battery has a property that it remarkably deteriorates depending on the way of being charged. For example, the depth of discharge, the charging frequency, and the charging current of the secondary battery influences how much the secondary battery is deteriorated. The repetition of the charging/discharging in the state in which the depth of discharge is small deteriorates the secondary battery. Further, the charging with a large charging current also deteriorates the secondary battery.

Accordingly, as shown in Patent Literature 1, for example, there is suggested a charging apparatus for suppressing the deterioration of the secondary battery caused by the repetition of the charging/discharging in the state in which the depth of discharge is small. With the use of the technology of Patent Literature 1, even when there is an error in the voltage detection, the deterioration of the secondary battery caused by accidentally returning to the full charge state soon can be suppressed.

CITATION LIST

Patent Literature

Patent Literature 1: JP H9-261882A

SUMMARY OF INVENTION

Technical Problem

However, in a conventional electronic device, the charging of a secondary battery was performed with a predetermined charging current. With a larger charging current, the charging can be performed within a shorter period of time. Accordingly, a value which is large to some extent is set as the charging current. Therefore, there was a problem that, even in the case where there was plenty of time available for the conventional electronic device to be charged, the charging was performed with a fixed charging current and the secondary battery was deteriorated.

Accordingly, the present invention has been made in the above-mentioned problem, and an object of the present invention is to provide an electronic device, a method of charging an electronic device, and a program, which are novel and improved, and which are capable of performing charging with a charging current depending on the time that can be used for the charging, and suppressing the deterioration of the secondary battery.

Solution to Problem

According to an aspect of the present invention, in order to achieve the above-mentioned object, there is provided an electronic device including a secondary battery capable of being charged repeatedly, a charging section which charges the secondary battery with power supplied from an external power supply section with a set charging current, a measurement section which measures an amount of charge accumulated in the secondary battery, a time information acquisition section which acquires time information, a storage section which stores charging history information created from data of a time period in which a user performs charging, and a control section which has a chargeable time estimation section that estimates chargeable time based on the charging history information and the time information, and a charging current setting section that calculates a restricted charging current which enables the secondary battery to be charged up to a charging capacity within the chargeable time, based on the amount of charge acquired from the measurement section, and sets the restricted charging current in the charging section.

According to such a configuration, the control section estimates the chargeable time based on the charging history information indicating the time period in which the user performs charging every day, and further calculates the restricted charging current at which the charging can be completed within the chargeable time. The charging section starts the charging with the restricted charging current. Accordingly, in the case where the chargeable time is long, the secondary battery can be charged with a charging current lower than usual, and hence, the deterioration of the secondary battery caused by the charging current can be suppressed.

The electronic device may further include a charging capability detection section which detects whether it is a state in which charging is possible from the power supply section. The control section may further include a charging history information creation section which causes the charging capability detection section to acquire charging capability information every predetermined time, and creates and stores in the storage section charging history information based on the charging capability information.

The control section may further include a charging mode determination section which determines, based on at least one of the amount of charge or the charging history information, which of the charging modes is to be used, a normal charging mode using a predetermined normal charging current, or a slow charging mode in which a restricted charging current is set based on the amount of charge and the chargeable time. In a case where the charging mode determination section determines to use the normal charging mode, the charging current setting section may set the normal charging current in the charging section, and in a case where the charging mode determination section determines to use the slow charging mode, the charging current setting section may calculate the restricted charging current and may set the restricted charging current in the charging section.

The electronic device may further include a display section which displays the charging mode and an estimated time of charging termination, which is a time at which the chargeable time terminates, and an input section which inputs operation information corresponding to an operation of a user to the control section. In a case where the operation information is input, the charging mode setting section may set the charging mode in accordance with the operation information, regardless of the amount of charge and the charging history information.

The charging capability detection section may transmit a state notification signal that performs notification of detecting connection and disconnection to a power supply section. The control section may further include a discharging history information creation section which, when receiving the state notification signal, causes the measurement section to measure an amount of charge, and creates and stores in the storage section discharging history information based on the amount of charge, and a charging capacity setting section which sets a charging capacity to a restricted charging capacity, which is restricted, based on the discharging history information.

Based on the amount of charge acquired from the measurement section and the discharging history information, in a case where an amount of discharge is equal to or more than a predetermined threshold, the charging capacity setting section may set the charging capacity to a maximum charging capacity.

Further, according to another aspect of the present invention, in order to achieve the above-mentioned object, there is provided a method of charging an electronic device including a secondary battery capable of being charged repeatedly, a charging section which charges the secondary battery with power supplied from an external power supply section with a set charging current, a measurement section which measures an amount of charge accumulated in the secondary battery, a time information acquisition section which acquires time information, a storage section which stores charging history information indicating a time period in which a user performs charging, and a control section having a chargeable time estimation section and a charging current setting section, the method including a step of estimating, by the chargeable time estimation section, chargeable time based on the charging history information and the time information, a step of calculating, by the charging current setting section, a restricted charging current which enables the secondary battery to be charged up to a charging capacity within the chargeable time, based on the amount of charge acquired from the measurement section, and a step of setting, by the charging current setting section, the restricted charging current in the charging section.

Further, according to another aspect of the present invention, in order to achieve the above-mentioned object, there is provided a program for causing a computer to function as an electronic device which includes a secondary battery capable of being charged repeatedly, a charging section which charges the secondary battery with power supplied from an external power supply section with a set charging current, a measurement section which measures an amount of charge accumulated in the secondary battery, a time information acquisition section which acquires time information, a storage section which stores charging history information indicating a time period in which a user performs charging, and a control section which has a chargeable time estimation section that estimates chargeable time based on the charging history information and the time information, and a charging current setting section that calculates a restricted charging current which enables the secondary battery to be charged up to a charging capacity within the chargeable time, based on the amount of charge acquired from the measurement section, and sets the restricted charging current in the charging section.

Further, according to another aspect of the present invention, in order to achieve the above-mentioned object, there is provided a charging control apparatus including an information acquisition section which acquires information on charging and discharging of a secondary battery, a charging time period determination section which determines a charging time period in which the secondary battery is charged based on the information acquired by the information acquisition section, and a charging current setting section which calculates a restricted charging current with which charging is performed up to a charging capacity within the charging time period determined by the chargeable time period determination section, and sets power supplied from a power supply section in a charging section that charges the secondary battery, as a charging current with which the secondary battery is charged.

The information acquisition section may acquire charging history information of the secondary battery and information of an amount of charge of the secondary battery as information on charging and discharging of the secondary battery. The charging time period determination section may determine the charging time period from a time period in which the secondary battery and the charging section are connected to each other, the time period being estimated based on the charging history information. The charging current setting section may set, in the charging section, a restricted charging current which makes an amount of charge of the secondary battery to become the charging capacity within the charging time period.

The information acquisition section may acquire pieces of information on charging and discharging of a plurality of the secondary batteries. The charging time period determination section may determine, based on the pieces of information on charging and discharging of the plurality of secondary batteries, respective charging time periods of the secondary batteries. The charging current setting section may set the restricted charging current that makes totals of the charging currents of the plurality of secondary batteries smooth.

The charging control apparatus may further include a charging capacity setting section which estimates an amount of discharge up to when the secondary battery is charged next based on the information acquired by the information acquisition section, and sets the charging capacity to a restricted charging capacity, which is restricted, in accordance with the estimated amount of discharge.

The information on charging and discharging of the secondary battery may further include schedule information on a user of an electronic device driven by the secondary battery.

The charging time period determination section and the charging current setting section may determine the charging time period and the charging current based on information on supply of power that the secondary battery is charged with.

The information on supply of power may include information of a priority time period which is preferentially used for charging the secondary battery.

The secondary battery may drive an electric vehicle. The information acquisition section may acquire driving history information of the electric vehicle.

Further, according to another aspect of the present invention, in order to achieve the above-mentioned object, there is provided a charging control method realized by causing arithmetic processing means of a charging control apparatus controlling charging of a secondary battery to execute predetermined procedures including an information acquisition step of acquiring information on charging and discharging of the secondary battery, a charging time period determination step of determining a charging time period in which the secondary battery is charged based on the information acquired in the information acquisition step, and a charging current setting step of calculating a restricted charging current with which charging is performed up to a charging capacity within the charging time period determined in the chargeable time period determination step, and setting power supplied from a power supply section in a charging section that charges the secondary battery, as a charging current with which the secondary battery is charged.

Advantageous Effects of Invention

According to the present invention as described above, charging can be performed with a charging current which is set depending on the time that can be used for the charging, and the deterioration of the secondary battery can be suppressed.

BRIEF DESCRIPTION OF DRAWINGS

FIG. 16 is an explanatory diagram of charging control of a plurality of secondary batteries.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

1. First Embodiment
   1-1. Outline
   1-2. Outline of charging control of electronic device
   1-3. Configuration of electronic device
   1-4. Operation of electronic device
   1-5. Examples of effects
2. Second Embodiment
   2-1. Outline of charging control of electronic device
   2-2. Configuration of electronic device
   2-3. Operation of electronic device
   2-4. Examples of effects
3. Third Embodiment
   3-1. Outline of charging control apparatus
   3-2. Configuration of charging control apparatus
   3-3. Examples of effects
4. Fourth Embodiment
   4-1. Outline of charging control apparatus
   4-2. Configuration of charging control apparatus
   4-3. Examples of applications 1. First Embodiment There will be described a first embodiment of the present invention.

[1-1. Outline]

Figure 1:
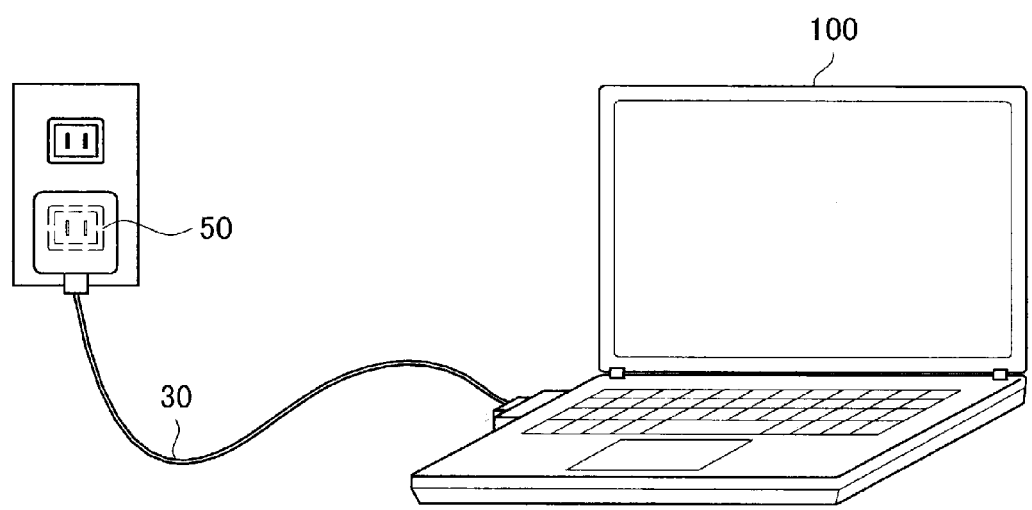
FIG. 1 is an explanatory diagram showing an outline of an electronic device according to an embodiment of the present invention.

FIG. 1 is an explanatory diagram showing an outline of an electronic device according to the present embodiment. An electronic device 100 according to the present embodiment has a secondary battery capable of being charged repeatedly, for example, and can be driven by the secondary battery, and it is possible to charge the secondary battery by connecting the electronic device to an external power source 50 that is a power source supply section such as a commercial power source.

In FIG. 1, the electronic device 100 is connected to the external power source 50 via a cable 30. However, the present invention is not limited to such an example. For example, the electronic device 100 may be connected to the external power source 50 via the cable 30 and a cradle, or, for example, the electronic device 100 may be connected to a cable that supports a USB (Universal Serial Bus) and the cable may be further connected to a PC (Personal Computer). In this case, the power is supplied from the external power source via the PC and the cable that supports the USB. Further, there may be used a non-contact charging mode. That is, the form thereof is not specified as long as the secondary battery of the electronic device 100 can be supplied with power.

The electronic device 100 is an electronic device which can be driven using power supplied from a secondary battery (not shown in FIG. 1) which is built into the device. Examples thereof include a mobile phone, a PDA (Personal Digital Assistant), a notebook PC, an IC recorder, a portable music player, and a digital camera. In FIG. 1, a case of a notebook PC is shown as an example.

In general, the battery life of the secondary battery deteriorates depending on the charging frequency, the depth of discharge, and the charging current, and the like thereof. However, in the past, as for the charging of the secondary battery, a single charging control has been performed. Therefore, the deterioration of the lifetime of the secondary battery was dependent on the way of being used by the user. Accordingly, the electronic device according to the present embodiment attempts to control the charging of the secondary battery, and to suppress the deterioration of the secondary battery. Hereinafter, the control method, the configuration, the operation, and the effects thereof will be described.

[1-2. Outline of Charging Control of Electronic Device]

Figure 2:
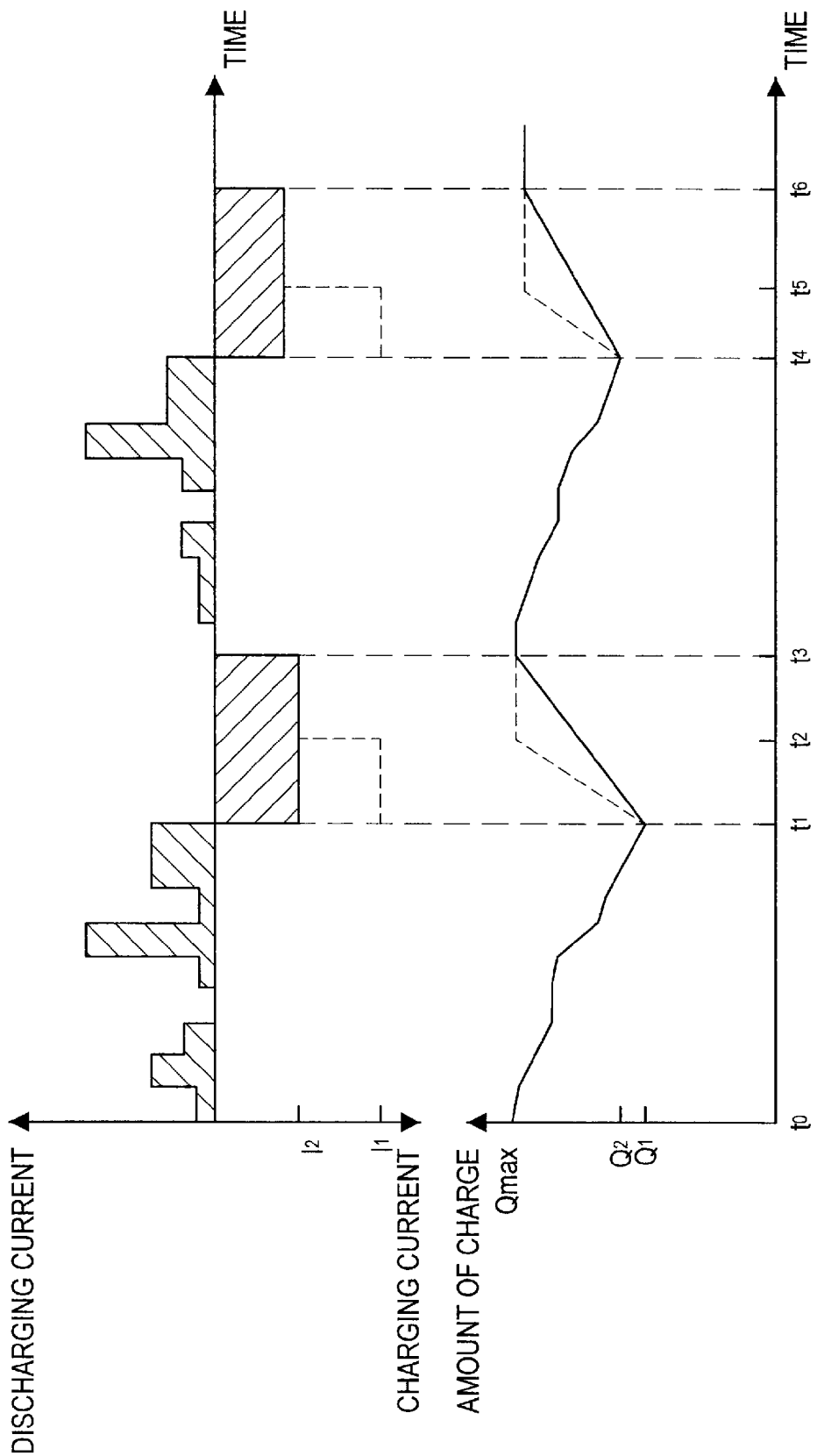
FIG. 2 is an explanatory diagram illustrating a method of charging an electronic device according to a first embodiment of the present invention.
Figure 10:
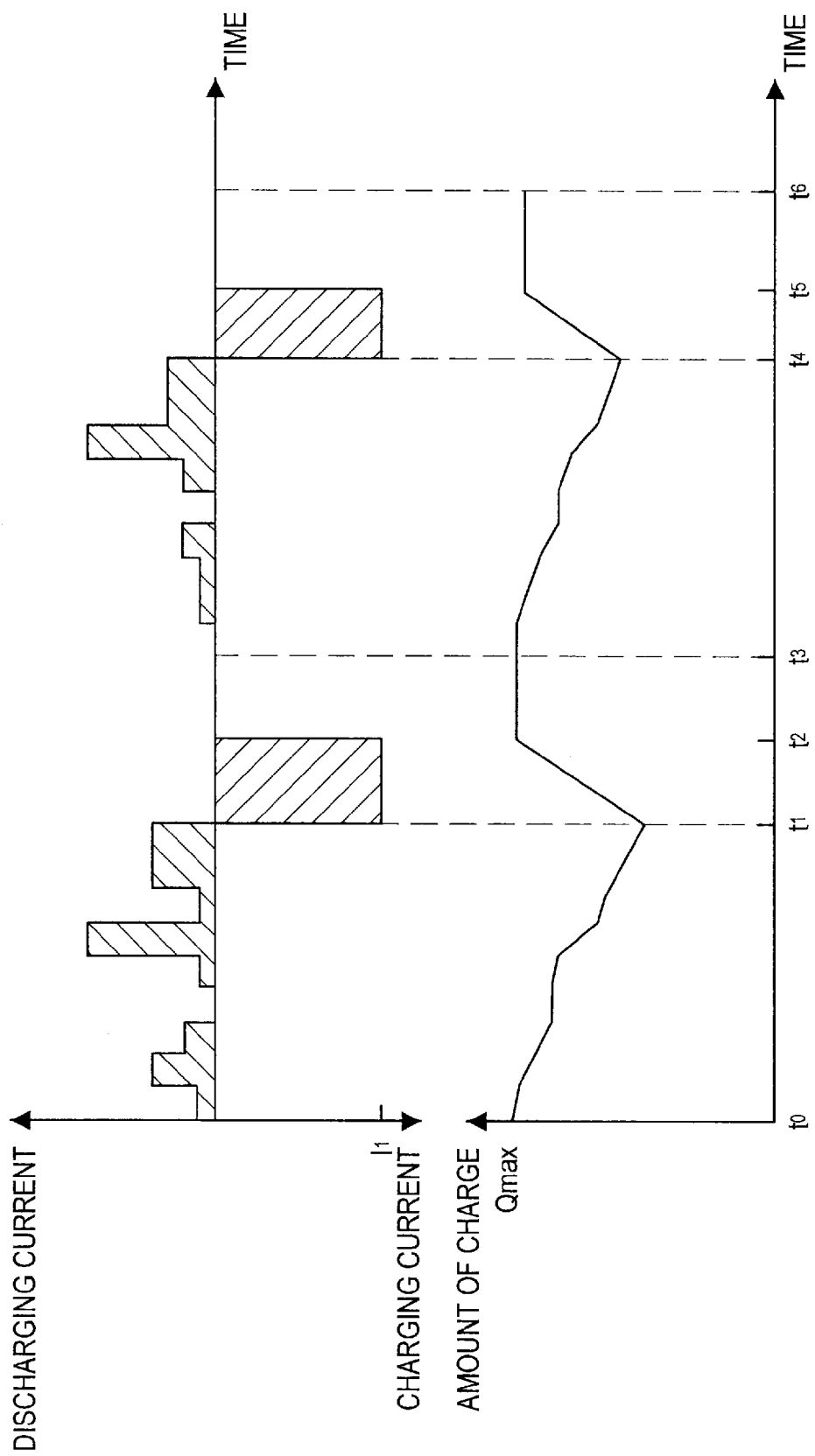
FIG. 10 is an explanatory diagram illustrating a conventional method of charging an electronic device.

Next, with reference to FIG. 10 and FIG. 2, an outline of a method of charging an electronic device according to the present embodiment will be described. FIG. 2 is an explanatory diagram illustrating a method of charging an electronic device according to the present embodiment. Further, FIG. 10 is an explanatory diagram illustrating a conventional method of charging an electronic device.

(Conventional Charging Control)

First, in order to describe the difference of the method of charging the electronic device according to the present embodiment from the conventional one, the conventional charging method will be described using FIG. 10. In FIG. 10, the horizontal axis of the top diagram represents time, and the vertical axis of the top diagram represents current values. Here, the vertical axis above the horizontal axis represents discharging current, and the vertical axis below the horizontal axis represents charging current. Further, the horizontal axis of the bottom diagram represents time, and the vertical axis of the bottom diagram represents amount of charge. In the top diagram and the bottom diagram, the time of the horizontal axes correspond to each other. Here, the amount of charge is the amount of power accumulated in a secondary battery at that time, and a charging capacity, which will be described below, is the amount of power that can be accumulated in the secondary battery.

In this example, it is assumed that chargeable time periods estimated from a charging history of the user are t1 to t3 and t4 to t6. In the conventional charging control, as shown in FIG. 10, even in the case where there was plenty of time that could be used for the charging, the charging was executed with a fixed charging current I1. Accordingly, even though actually being in a chargeable state from t1 to t3, the charging is completed at t2, and an effective utilization is not performed during the time t2 to t3, which is a state that maintains a full charge state.

When the deterioration caused by the charging current is not taken into consideration, the shorter the time for the charging, the more convenient it is for the user practically. However, the shorter time for the charging causes the charging current to be increased, and the battery deteriorates for that extent. Accordingly, the charging current is actually determined by taking into consideration the balance between practicability and the deterioration of the battery.

However, for this reason, even in the case where there was plenty of time available for the chargeable time, the charging current was fixed in the conventional charging control of the electronic device. The lower the charging current, the smaller the influence on the deterioration of the secondary battery. Therefore, when the charging is performed by taking the whole chargeable time period from t1 to t3 using lower charging current, the deterioration of the secondary battery can be suppressed.

(Charging Control According to the Present Embodiment)

Next, the method of charging the electronic device according to the present embodiment will be described using FIG. 2. In order to suppress the deterioration of the secondary battery, in the case where there is plenty of time that can be used for the charging, the electronic device according to the present embodiment reduces the charging current and performs charging slowly.

To be specific, at the start time of charging, for example, it is estimated and is set as chargeable time, that until when the user continues to perform charging by using history information of the user on the charging which has been collected in advance. Then, using the chargeable time, the charging current that enables the charging to be performed up to full charging capacity is determined.

Referring to the example of FIG. 2, at the time point t1, the estimation of the chargeable time and the calculation of the charging current are performed. Here, when it is estimated that the time that can be used for the charging is until t3, a charging current I2 is calculated, which enables the charging to be performed from the present amount of charge Q1 up to full charging capacity, Qmax, using the time from t1 to t3.

Further, in the same manner at the time point t4, when it is estimated that the chargeable time is from t4 to t6, the charging current is calculated, which enables the charging to be performed from the amount of charge Q2 at a time point (charging start time point) of t4 up to full charging capacity, Qmax, using the time from t4 to t6.

As described above, the deterioration of the secondary battery caused by the charging current can be suppressed by variably setting the charging capacity that has small influence on the deterioration depending on the time length that can be used for the charging and the amount of charge up to the charging capacity.

[1-3. Configuration of Electronic Device]

Figure 3:
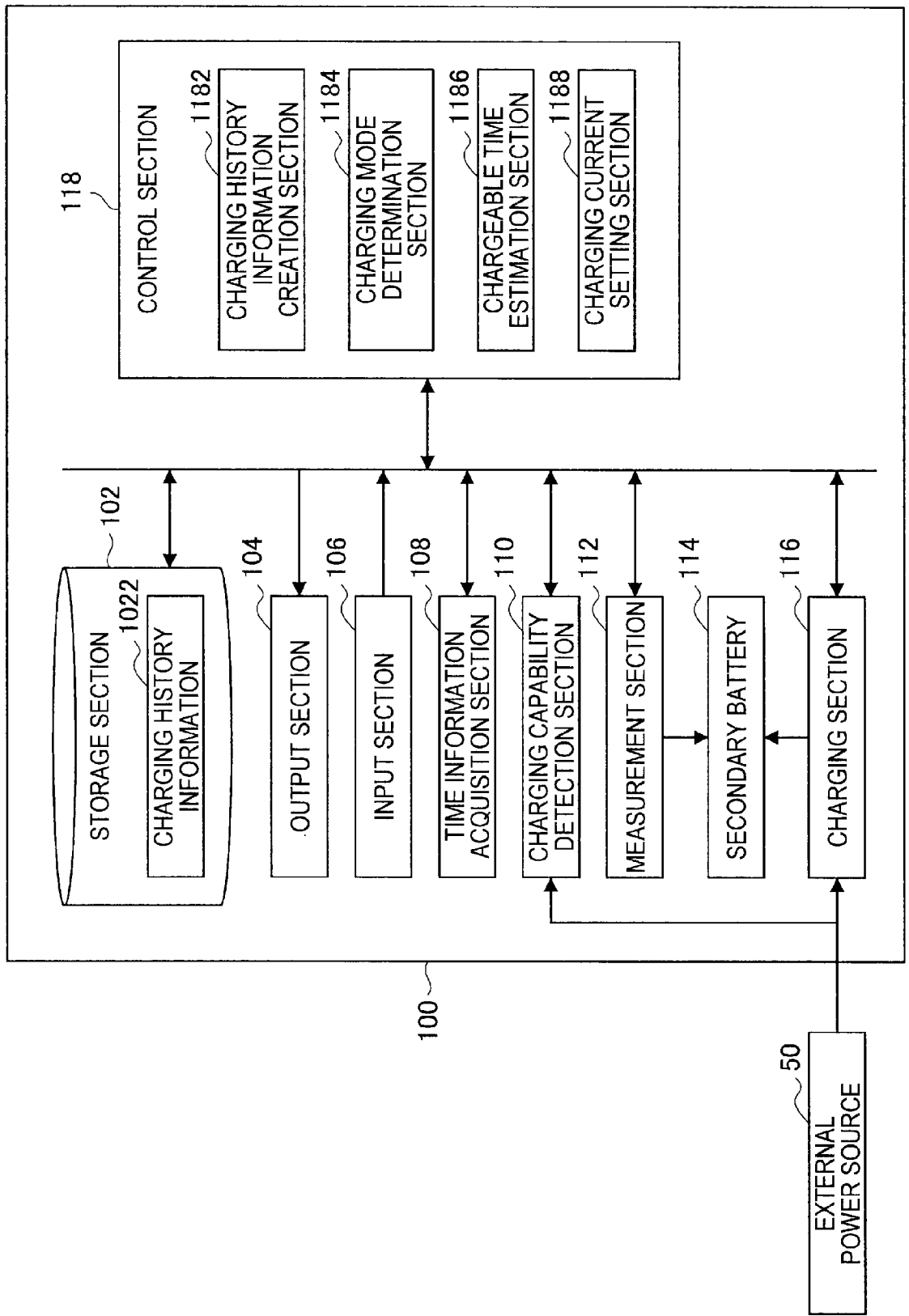
FIG. 3 is a block diagram showing a configuration of the electronic device according to the first embodiment of the present invention.

Next, there will be described a configuration of the electronic device 100 according to the first embodiment of the present invention for performing the above-mentioned charging control, using FIG. 3. FIG. 3 is a block diagram showing the configuration of the electronic device 100 according to the first embodiment of the present invention.

The electronic device 100 mainly includes a storage section 102, an output section 104, an operation section 106, a time information acquisition section 108, a charging capability detection section 110, a measurement section 112, a secondary battery 114, a charging section 116, and a control section 118.

(Storage Section: 102)

The storage section 102 is a storage apparatus for storing data, and is configured from, for example, a magnetic storage device such as an HDD (Hard Disk Drive), a semiconductor storage device, an optical storage device, a magneto-optical storage device, and the like. The storage section 101 has a function of storing a program and various types of data in which a procedure for executing each function of the control section 108 is written. In the present embodiment, the storage section 102 stores charging history information 1022 which is created by a charging history information creation section 1182 from data of time period in which the user performs charging.

(Output Section: 104)

Figure 4:
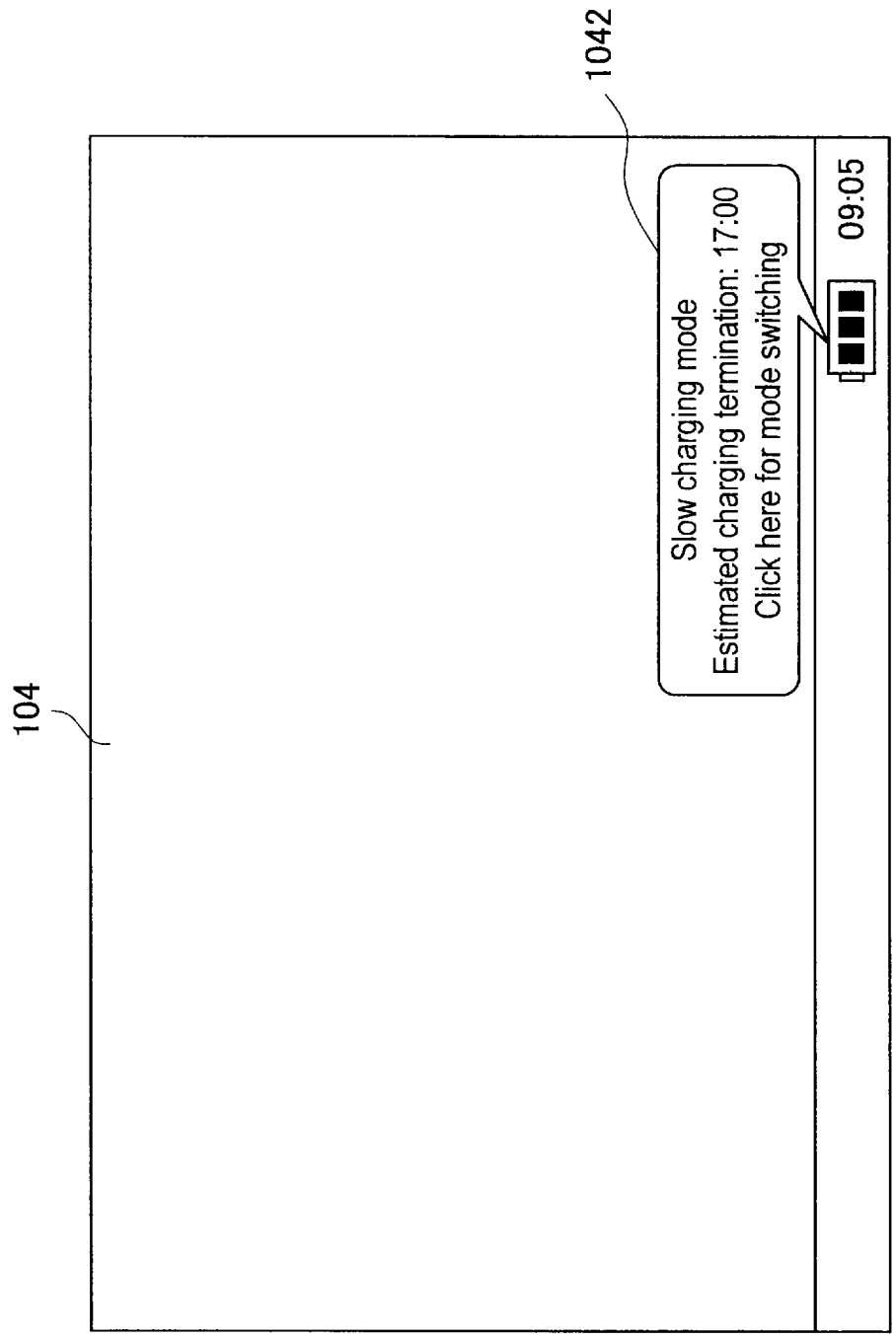
FIG. 4 is an explanatory diagram showing a display example of a display section of the electronic device according to the first embodiment of the present invention.

The output section 104 is a functional section which outputs information to the user. For example, it may be a display section of a liquid crystal display (LCD), a plasma display panel (PDP), a field emission display (FED), or an organic electroluminescence display (OELD), or may be a light emitting device such as a light emitting diode (LED) and may be an output section capable of performing notification to the user by the lighting thereof. For example, in the present embodiment, as shown in FIG. 4, the output section 104 is a display section and displays a message 1042 which notifies the user of a charging mode and an estimated time of charging termination. In addition, when the user clicks the message, the screen may be switched to the one for changing the charging mode. Further, for example, in the case of using the light emitting device, the output section 104 may show the charging mode at that time point by the lighting thereof. FIG. 4 is an explanatory diagram showing a display example of the display section of the electronic device according to the first embodiment of the present invention.

(Input Section: 106)

The input section 106 has an operation section which can accept input of operation from the user, such as a button, a switch, a touch panel, a mouse, a keyboard, and a lever, or the connection interface thereof, for example. Further, the input section 106 may be a remote control means using an infrared ray or other radio waves, for example. Still further, the input section 106 may be configured from an input control circuit or the like for generating operation information based on the information input by the user using the operation section and outputting the operation information to the control section 118. The user of the electronic device 100 can input various types of data and provide instruction on processing operation to the electronic device 100 by operating the input section 106. In the present embodiment, the input section 106 is, although not shown, a connection interface such as a mouse.

(Time Information Acquisition Section: 108)

The time information acquisition section 108 has a function of acquiring time information at that time point. The time information acquisition section 108 may be realized by a real time clock (RTC) which is built into the electronic device 100, for example. Further, the time information acquisition section 108 may be an interface for acquiring the time information from outside of the electronic device 100.

(Charging Capability Detection Section: 110)

The charging capability detection section 110 has a function of detecting whether the electronic device 100 is in a state that can receive power supply from the external power source 50, that is, whether it is the state in which the charging is possible. The charging capability detection section 110 performs notification of charging capability information in response to a request from the control section 118. Further, when the charging capability state from the external power source 50 is changed, the charging capability detection section 110 has a function of notifying the control section 118 accordingly by transmitting a state notification signal that performs notification that the connection and disconnection with the external power source 50 are detected.

(Measurement Section: 112)

The measurement section 112 has a function of measuring the state of the secondary battery 114. The measurement section 112 measures the amount of charge accumulated in the secondary battery 114 in response to a request from the control section 118, and notifies the control section 118 of the measured amount of charge. Further, the measurement section 112 may have a function of regularly measuring the amount of charge of the secondary battery 114, and, in the case where the amount of charge is equal to or more than a predetermined threshold or equal to or less than a predetermined threshold, of notifying the control section 118 accordingly. The measurement section 112 may be realized using a coulomb counter.

(Secondary Battery: 114)

The secondary battery 114 is a battery which is capable of being charged repeatedly. Examples thereof include, but are not limited to, a lithium-ion secondary battery and a lithium-ion polymer secondary battery.

(Charging Section: 116)

The charging section 116 has a function of charging the secondary battery 114 with power supplied from the external power source 50. For example, the charging section 116 may be realized by a charging circuit. Further, the charging section 116 charges the secondary battery 114 with the charging current set by the control section 118.

(Control Section: 118)

The control section 118 has a function of controlling entire operation of the electronic device 100. For example, the control section 118 is realized by a CPU (Central Processing Unit) and the like. The control section 118 mainly includes the charging history information creation section 1182, a charging mode determination section 1184, a chargeable time estimation section 1186, and a charging current setting section 1188, and has a function as a charging control section which controls entire operation of each of those functional sections. That is, the control section 118 detects the start, termination, and completion of charging, and also controls optimization of a chargeable time calculation algorithm, which will be described below. Note that those respective functional sections which configure the control section may be provided separately from each other. Alternatively, some of or all of those respective functional sections may be provided in an integrated manner with each other.

(Charging History Information Creation Section: 1182)

The charging history information creation section 1182 has a function of creating and storing in the storage section 102 the charging history information 1022 indicating a time period in which the user charges the secondary battery 114 of the electronic device 100. The charging history information creation section 1182 can cause the charging capability detection section to acquire the charging capability information every predetermined time, and can create charging history information based on the charging capability information. Here, as an example of a charging history information creation algorithm, there will be described an example in which a connection state of the external power source 50 is recorded every hour and the charging is controlled based on day-to-day tendency.

Here, the charging history information 1022 has 24 variables in total of N=0 to 23 (every hour from 0 o'clock to 23 o'clock), for example, as is represented as a table F[N]=[f(0), f(1), ... f(n), ... f(23)]=[0, 0, ... 0, ... 0], in which all of the initial values are 0. The charging history information creation section 1182 of the control section 118 requires the charging capability detection section 110 to detect the connection state of the external power source 50 when N=n, determines a variable "a", in which a case of being connected is represented by 1 and a case of not being connected is represented by 0, performs calculation of f(n) using the following Equation 1 with respect to the history, and updates the history. Here, r represents a fixed constant of 0 to 1.

$$f(n)=r*a+(1-r)*f(n-1) \quad \text{(Equation 1)}$$

At the start time of charging, the charging mode determination section 1184 determines slow charging and normal charging by comparing the value of f(n) with a threshold e used for switching between the slow charging and the normal charging. The value of e may be optimized by reflecting an actual charging situation, as will be described later. That is, a result of charging is reflected.

(Charging Mode Determination Section: 1184)

At the start time of charging, the charging mode determination section 1184 has a function of determining which of the charging modes is to be used: a normal charging mode using a predetermined normal charging current; or a slow charging mode in which a restricted charging current is calculated based on the amount of charge accumulated in the secondary battery and chargeable time, and the restricted charging current is used. In this case, the start time of charging may be identified by performing, by the charging capability detection section, the notification indicating that the state is changed into a chargeable state. Further, the determination of the charging mode may be performed based on at least one of the amount of charge of the secondary battery or the charging history information 1022. For example, using the above Equation 1, it may be determined to be the slow charging in the case where f(n)≥e is satisfied, and the normal charging in the case where f(n)<e is satisfied. Here, f(n) becomes larger number as the possibility that the charging is being executed at the time n becomes higher. That is, when it is the time period in which the charging is normally performed, the slow charging is to be performed. Further, in the case where the amount of charge is remarkably small, the normal charging may be executed even when it is the time period in which the slow charging can be performed. Further, the determination based on the amount of charge can be omitted.

Further, the charging mode determination section 1184 is also capable of switching the charging mode depending on the operation of the user, regardless of the above determination. Let us assume that the user normally charges the electronic device 100 from arrival at work at 9 o'clock in the morning to quitting time at 17 o'clock. Accordingly, the charging mode determination section 1184 determines to use the slow charging mode. Then, as shown in FIG. 4 for example, the output section 104 displays the message 1042 which performs notification of the charging mode and the estimated time of charging termination. However, for example, in the case where the user is scheduled to go out that day and the charging needs to be completed quickly, the user confirms and clicks the message 1042, and performs an operation of switching the charging mode on a mode switching screen, which is not shown. The charging mode determination section 1184 switches the charging mode when detecting this input. That is, when operation information corresponding to the operation of the user is input in the state in which the notification of the charging mode and the estimated time of charging termination is performed on the display of the output section 404, the charging mode setting section 1184 can set the charging mode in accordance with the input operation information, regardless of the amount of charge and the charging history information.

(Chargeable Time Estimation Section: 1186)

The chargeable time estimation section 1186 has a function of estimating chargeable time indicating the time that the user will continue charging based on the charging history information 1022 stored in the storage section 102 and the time information acquired from the time information acquisition section 108. For example, when considering the case of using the above Equation 1, f(n+1), f(n+2), . . . are compared with e, and an interval that is continuously equal to or more than the threshold e is determined as the chargeable time.

(Charging Current Setting Section: 1188)

The charging current setting section 1188 has a function of calculating the charging current to be used for the charging and setting the charging current in the charging section 116. The charging current setting section 1188 sets the charging current depending on the charging mode that is determined by the charging mode determination section 1184. That is, in the case where the charging mode is the normal charging mode, the charging current setting section 1188 sets a predetermined normal charging current in the charging section 116. Further, in the case where the charging mode is the slow charging mode, the charging current setting section 1188 calculates a restricted charging current, and sets the restricted charging current in the charging section 116. In this case, the charging current setting section 1188 calculates the restricted charging current which enables the secondary battery 114 to be charged up to maximum charging capacity within the chargeable time estimated by the chargeable time estimation section 1186, based on the amount of charge acquired from the measurement section 112, and sets this restricted charging current in the charging section 116. Here, in order to suppress the deterioration of the secondary battery 114, it is desirable that the restricted charging current is a value with which the charging is completed within the chargeable time and is a value that is as small as possible.

[1-4. Operation of Electronic Device]

Figure 5:
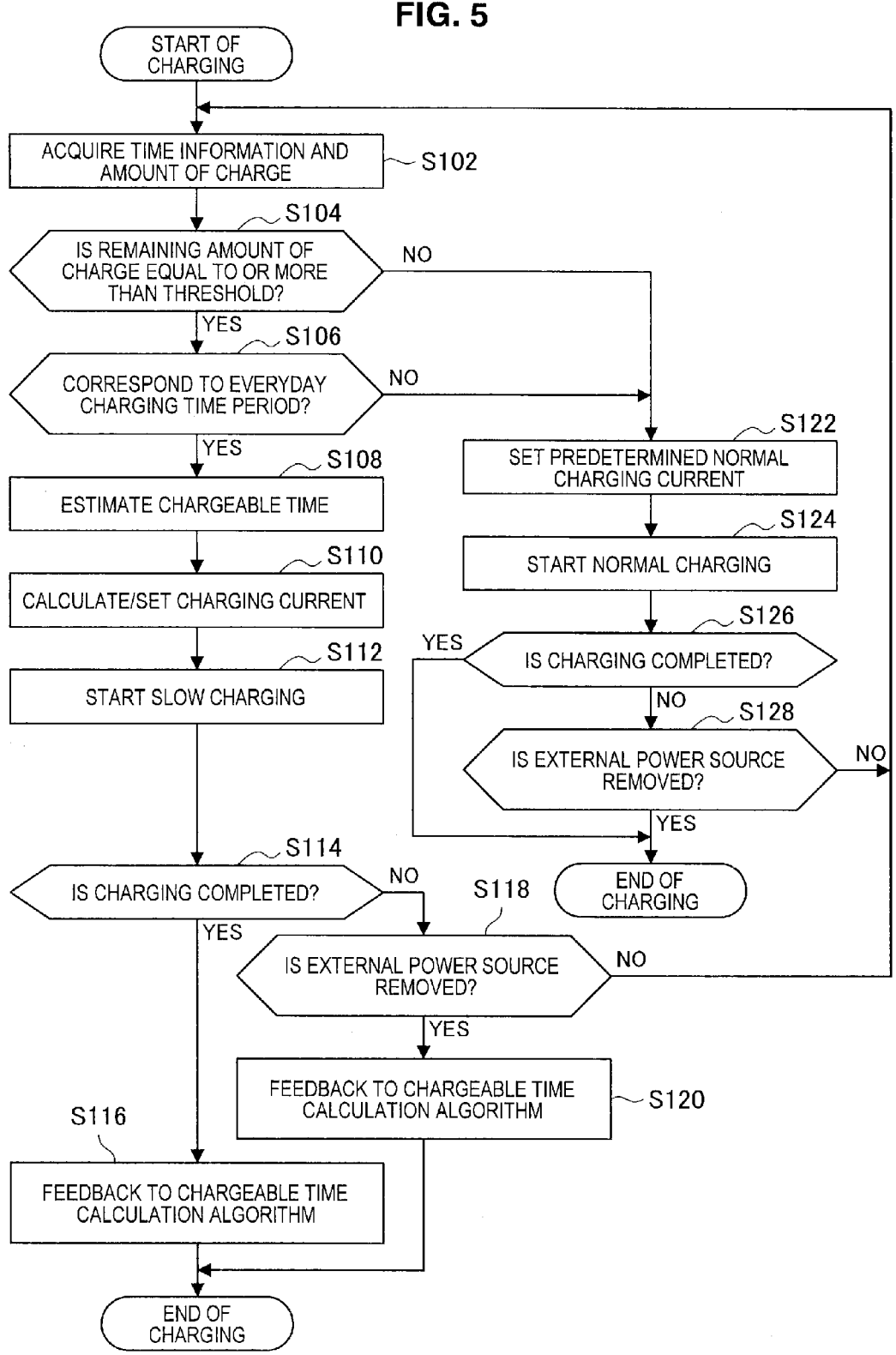
FIG. 5 is a flowchart showing a charging operation performed by the electronic device according to the first embodiment of the present invention.

Here, an operation of charging of the electronic device 100 will be described using FIG. 5. FIG. 5 is a flowchart showing a charging operation performed by the electronic device according to the present embodiment.

First, the control section 118 detects the start of charging. Here, for example, the charging capability detection section 110 may notify the control section 118 that it has become a chargeable state, and hence, the start of charging may be detected. Further, for example, the charging may be started by internal processing of the electronic device 100.

Then, when the start of charging is detected, the charging mode determination section 1184 issues instructions to the time information acquisition section 108 and the measurement section 112, and acquires time information and amount of charge (S102). Then, the charging mode determination section 1184 determines whether the amount of charge is equal to or more than a predetermined threshold (S104). Here, it is desirable that the predetermined threshold is a sufficiently low value. It is because, in the case where the amount of charge is such a low value that has an influence on the operation of the electronic device 100, the determination deals with the case where it is desirable to perform normal charging. Then, the charging mode determination section 1184 determines whether the time at the start time of charging corresponds to the everyday charging time period based on the acquired time information (S106). Here, whether it corresponds to the everyday charging time period may be determined by comparing f(n) with threshold e, in the case of using Equation 1 as described above.

In the case where it is determined in Step S106 that it corresponds to the everyday charging time period, the charging mode determination section 1184 determines the charging mode to be a slow charging mode. Next, the chargeable time estimation section 1186 estimates chargeable time (S108). Here, as described above, in the case of using Equation 1, referring to the table that stores the charging history information, an interval in which f(n+1), f(n+2), . . . are continuously equal to or more than the threshold e may be determined to be the chargeable time.

Then the charging current setting section calculates the restricted charging current and sets the restricted charging current in the charging section 116, using the estimated chargeable time and the amount of charge acquired in Step S102 (S110).

The charging section 116 starts charging using the set restricted charging current (S112). Then, the control section 118 determines whether the charging is completed, using information from the charging section 116 (S114). Here, the charging completion represents that the secondary battery 114 is charged up to full charging capacity (or nearly full charging capacity). Further, the charging termination includes, in addition to the charging completion, the termination caused by removing the electronic device 100 from the external power source 50.

In the case where it is determined in Step S114 that the charging is completed, the control section 118 performs feedback to the chargeable time calculation algorithm (S116). That is, since the case of Step S116 is the case in which the charging has completed within the chargeable time, the threshold e may be reduced.

On the other hand, in the case where it is determined in Step S114 that the charging is not completed, the control section further determines whether the external power source is removed (S118). In Step S118, in the case where the external power source is not removed, the processing returns to Step S102 again. Further, in the case where it is determined in Step S118 that the external power source is removed, the feedback to the chargeable time calculation algorithm is performed (S120). That is, since the case of Step S120 is the case in which the charging has not completed within the chargeable time and the charging is terminated, the threshold e may be increased.

On the other hand, in the case where the amount of charge that is remaining is equal to or less than a threshold in Step S104, that is, in the case where the amount of charge that is remaining is remarkably small, and in the case where the start time of charging does not correspond to the everyday charging time period, the charging mode determination section 1184 determines the charging mode to be a normal charging mode. In this case, the charging current setting section 1188 sets a predetermined normal charging current in the charging section 116. The charging section 116 starts the normal charging using the normal charging current.

The control section 118 monitors the charging state of the secondary battery 114, and determines whether the charging is completed (S126). In the case where the charging is completed, the control section 118 terminates charging, and, in the case where the charging is not completed, the control section 118 determines whether the external power source 50 is removed (S128).

[1-5. Examples of Effects]

When the electronic device 100 according to the first embodiment of the present invention is used, the charging current can be made variable at the start time of charging based on the amount of charge and the chargeable time at that time. For example, in the case where the charging is started in a time period different from a normal charging time period, the charging is performed at a high rate to some extent using a normal charging current. In the case where the charging is started in a time period in which the charging is normally performed, the charging is performed slowly using a charging current that is more restricted than usual.

In this case, with the accumulation of the data of time period in which the user performs charging every day, the determination on whether it is the time period in which the normal charging is being executed can be performed. Further, by determining the time during which the time period in which the charging is performed every day continues, it becomes possible to estimate the chargeable time period.

When a low charging current is used, the deterioration of the secondary battery can be suppressed and the life time of the secondary battery can be extended compared to the case of using the normal charging current. Further, by using the normal unrestricted charging current in the case where the amount of charge is remarkably small and it is not the everyday charging time period, the case where there is not enough time for the charging can be dealt with, and the convenience for the user is improved.

In addition, a message performing notification of the charging mode and the estimated time of charging termination is displayed on the screen, and hence, the user can find out the charging mode that is currently being used and the time at which the charging is terminated. By looking at this, a charging mode switching operation can be performed in the case where change in the charging mode is necessary. In the present embodiment, the everyday charging pattern of the user is analyzed, and in the case where the user is living with the same pattern, the electronic device 100 automatically controls the charging. However, in the case where the user moves in a pattern different from every day, for example, in the case of being away on business, there is a case that the automatic control cannot respond to. When it becomes possible for the user himself/herself to switch the charging mode, the case in which the user moves differently from every day can also be dealt with.

2. Second Embodiment

[2-1. Outline of Charging Control of Electronic Device]

Figure 6:
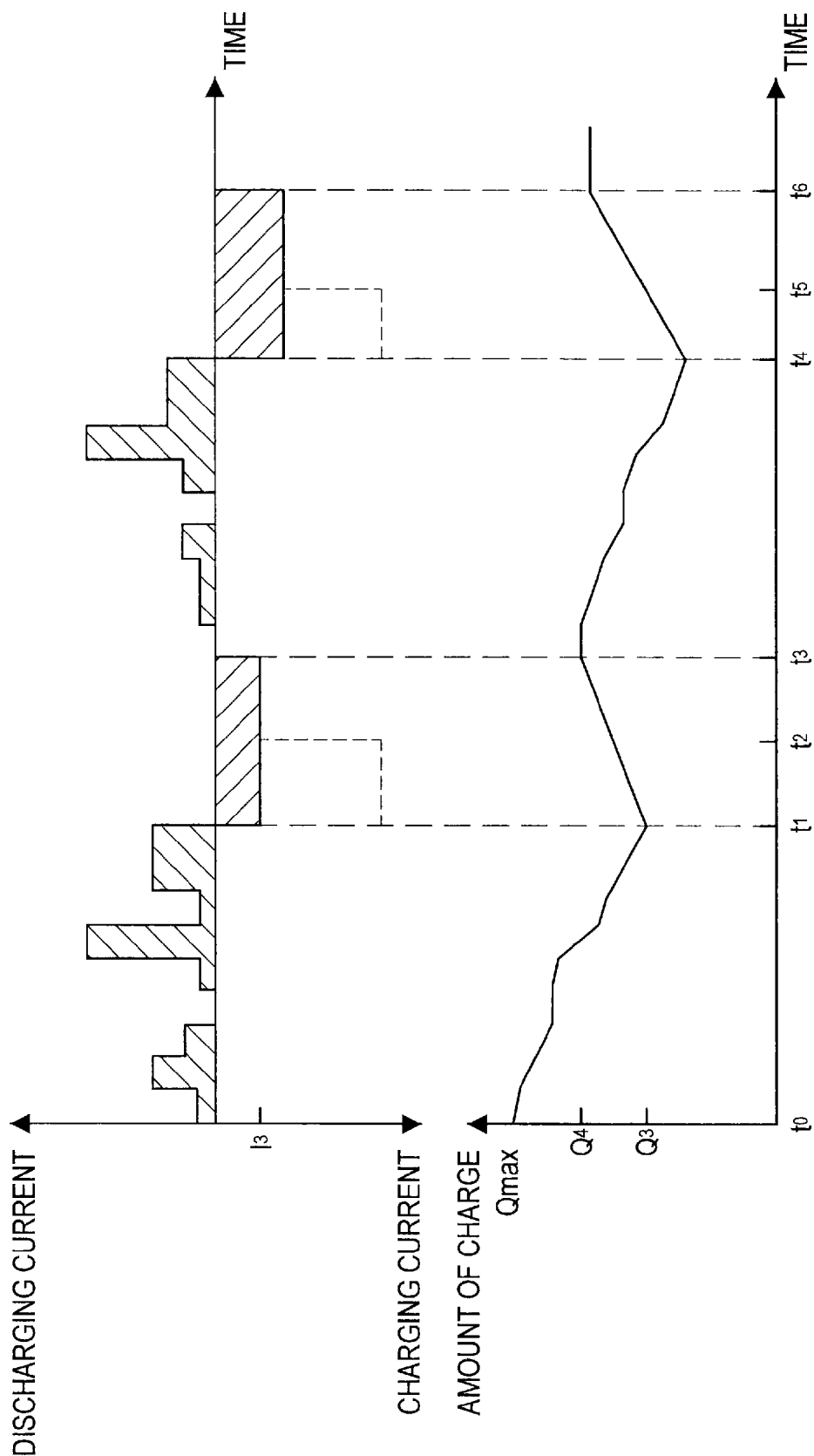
FIG. 6 is an explanatory diagram illustrating a method of charging an electronic device according to a second embodiment of the present invention.
Figure 7:
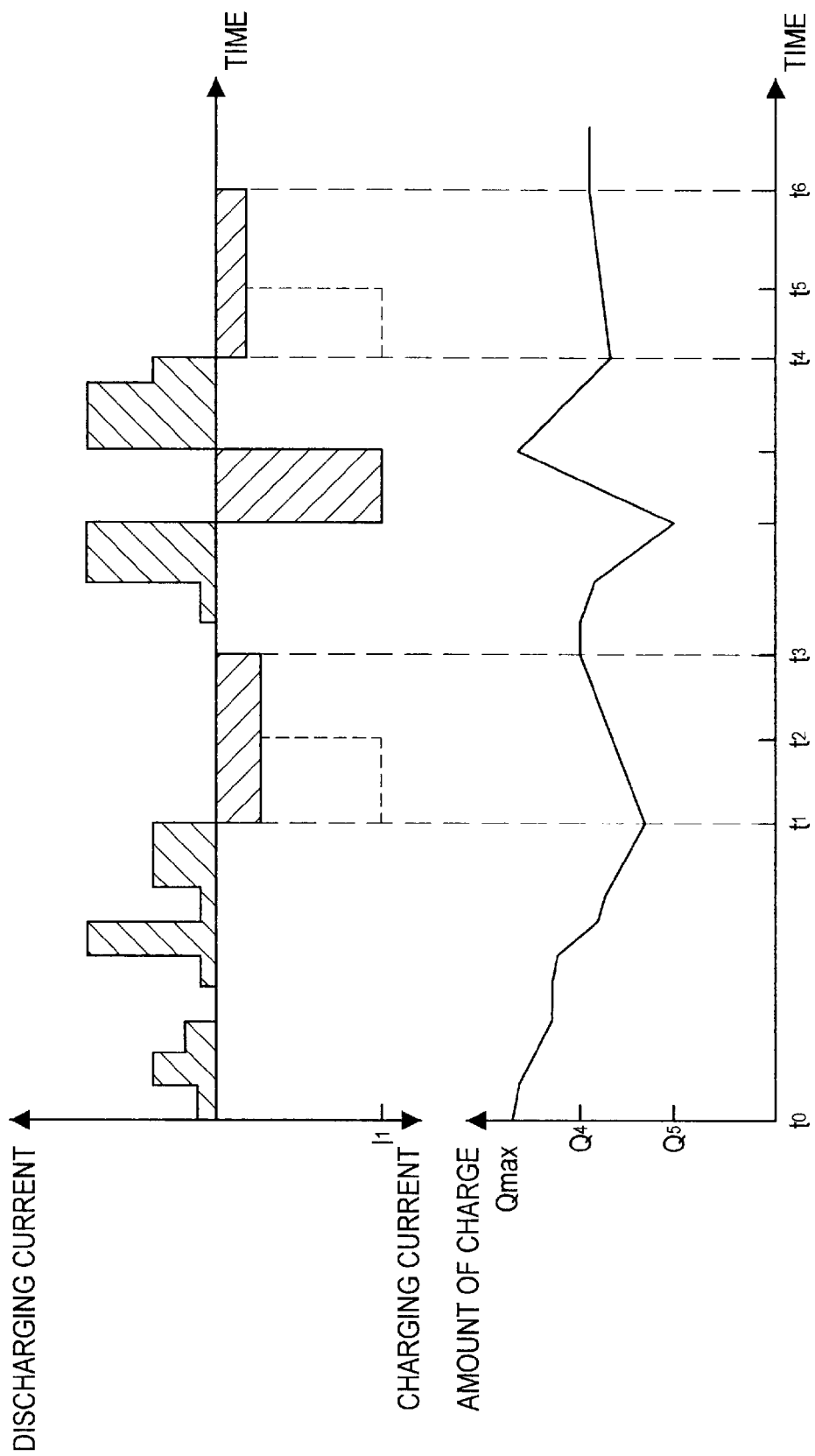
FIG. 7 is an explanatory diagram illustrating behavior in an exceptional instance of the method of charging the electronic device according to the second embodiment of the present invention.

Next, an outline of charging control of an electronic device 200 according to a second embodiment of the present invention will be described using FIG. 6 and FIG. 7, comparing with FIG. 2. FIG. 6 is an explanatory diagram illustrating a method of charging the electronic device 200 according to the present embodiment. Further, FIG. 7 is an explanatory diagram illustrating behavior in an exceptional instance of the method of charging the electronic device 200 according to the present embodiment.

First, referring to FIG. 2, it can be seen that the user only uses the amount of power from Q1 to Qmax every day. Although FIG. 2 only shows data of a short period of time, more accurate value can be obtained by collecting statistics over a long period of time in the same manner.

The secondary battery largely deteriorates by repeating the charging/discharging in the state near full charge state. Therefore, essentially, it is more desirable for the characteristics of the secondary battery that the secondary battery is not charged up to the maximum charging capacity. Accordingly, the electronic device 200 according to the present embodiment collects statistics of the amount of power that the user uses every day, and is allowed to be capable of restricting the charging capacity.

Referring to FIG. 6, the charging capacity of the secondary battery charged up to the maximum charging capacity Qmax at t0 is restricted to the range that is enough for the supply of the amount of power, which is used every day. That is, the charging capacity is restricted to Q4. Accordingly, since the secondary battery does not repeat the charging/discharging in the vicinity of Q4 to Qmax, which is the state near the full charge state, it becomes possible to suppress the deterioration of the secondary battery.

For example, at a time point of t1, if the charging capacity is set to Q4, a charging current I3 with which the charging can be performed from Q3 to Q4 using the time from t1 to t3 is calculated.

However, for example, in the case where the amount of power that is more than that of every day is required, there are also cases where it is desirable that the charging is performed up to the maximum charging capacity. In order to deal with such cases, in the case of detecting discharge tendency that is different from everyday discharge tendency in the present embodiment, the electronic device 200 automatically puts back the charging capacity to the maximum charging capacity Qmax. Referring to the example of FIG. 7, the discharge larger than usual is performed between t3 and t7. In this case, let us assume that the charging is started from a time period t7, which is different from every day. Before that, the charging capacity was restricted to Q4. However, since the charging time which is different from that of every day and the discharge tendency which is different from that of every day are detected, the electronic device 200 performs charging up to the maximum charging capacity Qmax.

[2-2. Configuration of Electronic Device]

Figure 8:
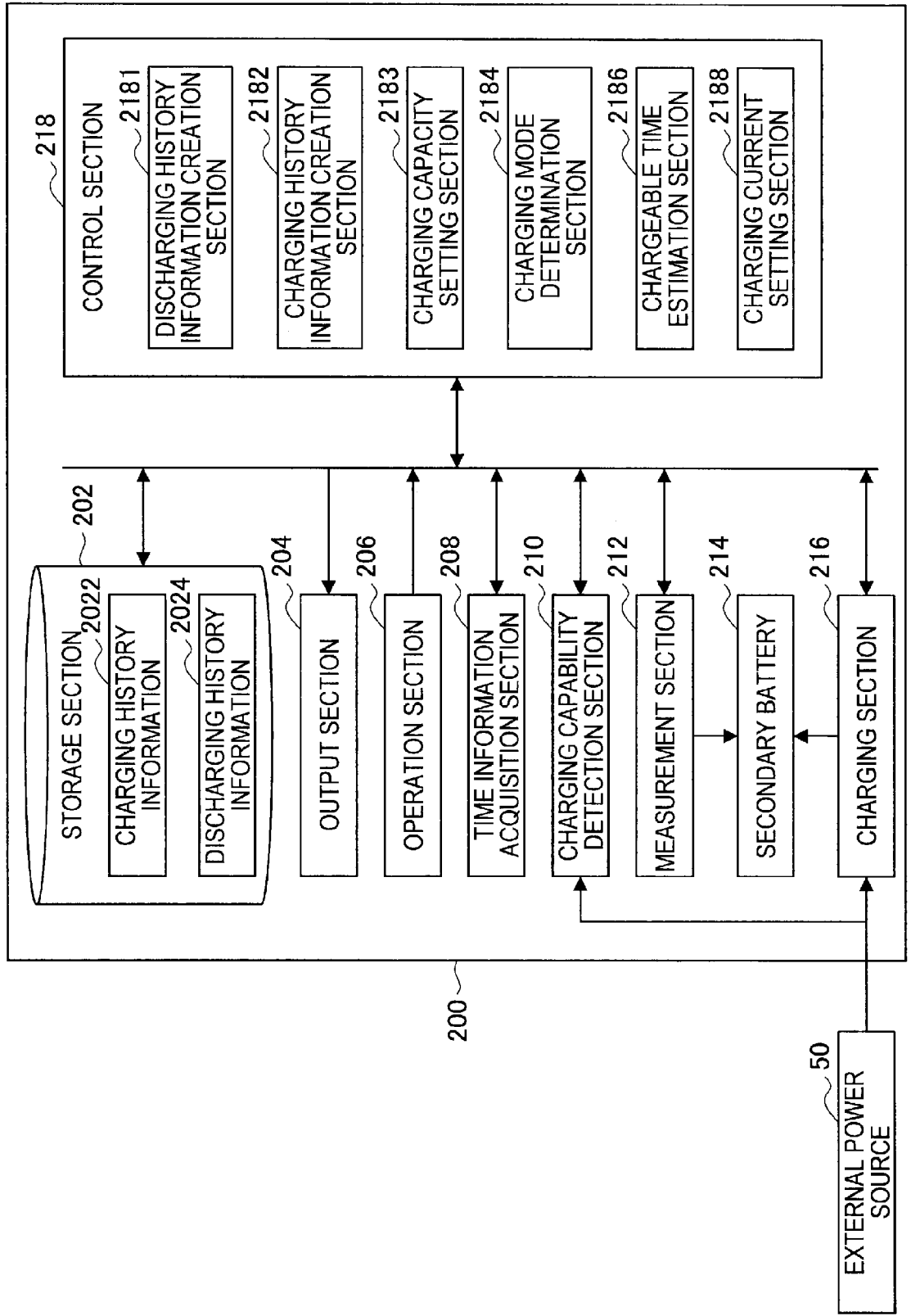
FIG. 8 is a block diagram showing a configuration of the electronic device according to the second embodiment of the present invention.

Next, the there will be described a configuration of the electronic device 200 according to the second embodiment of the present invention for performing the above-mentioned charging control, using FIG. 8. FIG. 8 is a block diagram showing the configuration of the electronic device 200 according to the present embodiment.

The electronic device 200 mainly includes a storage section 202, an output section 204, an input section 206, a time information acquisition section 208, a charging capability detection section 210, a measurement section 212, a secondary battery 214, a charging section 216, and a control section 218. Note that, in the configuration of the electronic device according to the present embodiment, the description on the configuration which is the same as that of the first embodiment will be omitted, and the description will be made mainly on the section in which the configuration is different.

The storage section 202 further stores discharging history information 2024. The discharging history information 2024 is created by a discharging history information creation section 2181, which will be described below, and is stored in the storage section 202.

The control section 218 further includes the discharging history information creation section 2181 and a charging capacity setting section 2183.

The discharging history information creation section 2181 causes the amount of power used by the user every day to be measured and creates discharging history information. For example, the discharging history information creation section 2181 causes the measurement section 212 to measure the amounts of charge at the end time of charging and at the start time of charging. Then, the discharging history information creation section 2181 calculates the amount of discharge using the amounts of charge. When receiving a state notification signal from the charging capability detection section 210, the discharging history information creation section 2181 may cause the measurement section 212 to measure the amount of charge, and may create the discharging history information based on the measured amount of charge. For example, the amount of charge at the start time of charging is subtracted from the amount of charge at the last end time of charging, and the difference between the amount of charge at the last end time of charging and the amount of charge at the start time of charging is stored as an amount of discharge. Further, the average value of amounts of discharge may be stored. Still further, for example, the discharging history information creation section 2181 may measure the amounts of discharge every constant period (for example, 500 ms), and may store the value obtained by averaging those values for each hour as the discharging history information.

The charging capacity setting section 2183 sets the charging capacity of the secondary battery 214 to a restricted charging capacity value, which is restricted, based on the discharging history information. In the case where the restricted charging capacity is set, the control section 218 terminates charging when the amount of charge of the secondary battery 214 reaches the restricted charging capacity. Further, based on the amount of charge acquired from the measurement section and the discharging history information, in the case where the amount of discharge is equal to or more than a predetermined threshold, the charging capacity setting section 2183 may set the charging capacity to a maximum charging capacity.

[2-3. Operation of Electronic Device]

Figure 9:
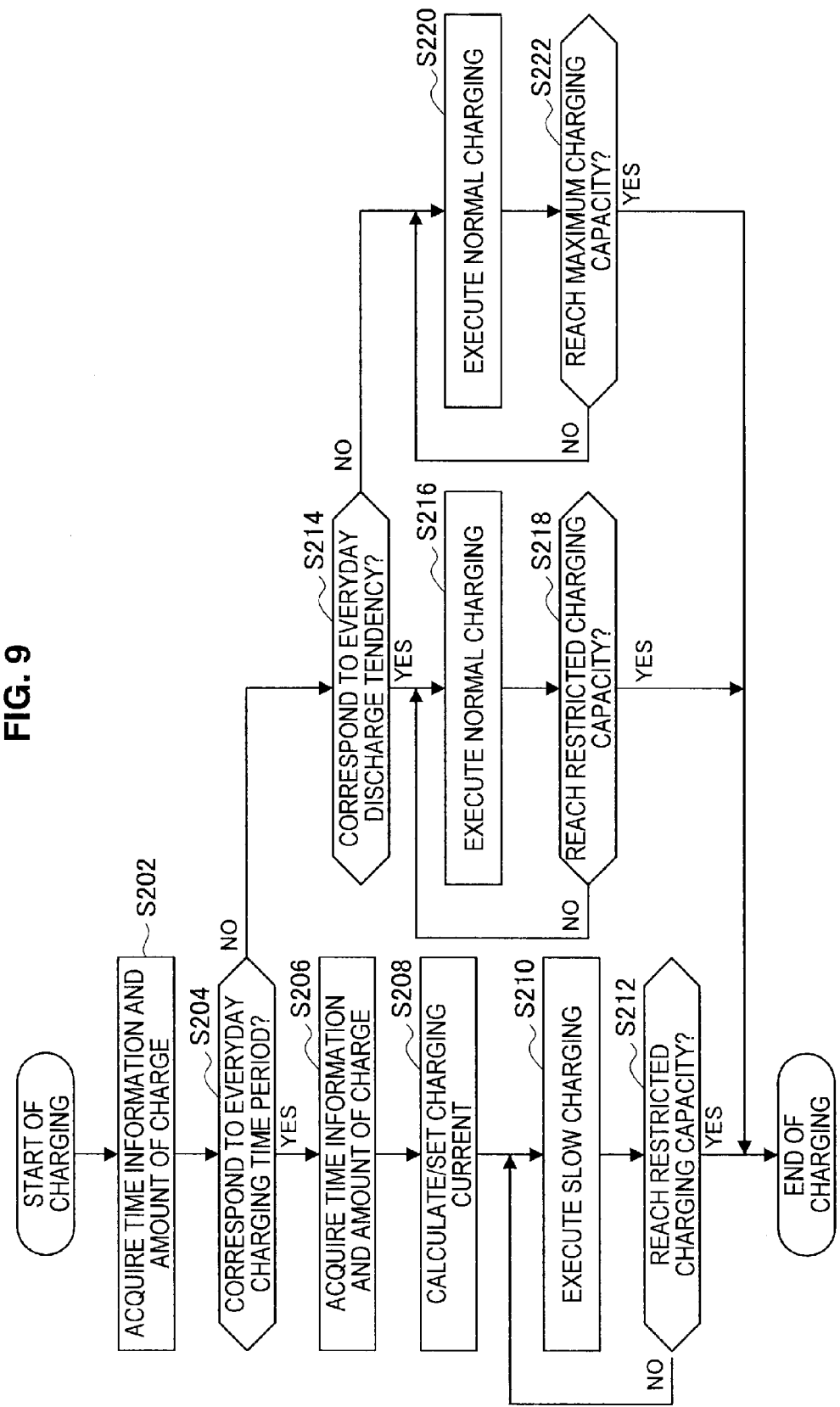
FIG. 9 is a flowchart showing a charging operation performed by the electronic device according to the second embodiment of the present invention.

Next, an operation of the electronic device 200 will be described using FIG. 9. FIG. 9 is a flowchart showing a charging operation performed by the electronic device 200 according to the present embodiment.

In FIG. 9, a case is assumed that the charging capacity is already set to the restricted charging capacity based on the discharging history information, as a premise.

The control section 218 detects the start of charging by receiving a state notification signal transmitted from the charging capability detection section 210. Then, the charging mode determination section 2184 issues instructions to the time information acquisition section 208 and the measurement section 212, thereby acquiring time information and amount of charge (S202). Then, the charging mode determination section 2184 determines whether it corresponds to the everyday charging time period (S204).

Here, in the case where the time at which charging starts corresponds to the everyday charging time period, the charging mode determination section 2184 determines the charging mode to be a slow charging mode. Next, the chargeable time estimation section 2186 estimates chargeable time (S206). Then, the charging current setting section 2188 calculates the restricted charging current and sets the restricted charging current in the charging section 216, using the estimated chargeable time and the amount of charge acquired in Step S202 (S208).

The charging section 216 starts slow charging using the set restricted charging current (S210). Then, the control section 218 determines whether the amount of charge of the secondary battery 214 reaches the restricted charging capacity that has been set in advance in the charging capacity setting section 2183 (S212). Then, the control section repeats Step S210 and Step S212 until the amount of charge of the secondary battery 214 reaches the restricted charging capacity. When the amount of charge reaches the restricted charging capacity, the control section 218 causes the charging to be terminated.

Note that the contents of respective steps from Step S206 to Step S210 correspond to those of Step S108 to Step S112 according to the first embodiment, respectively.

On the other hand, in the case where the charging mode determination section 2184 determines in Step S204 that it does not correspond to the everyday charging time period, the charging mode determination section 2184 determines the charging mode to be a normal charging mode. Then, the charging capacity setting section 2183 determines whether it corresponds to everyday discharge tendency based on the acquired amount of charge (S214). Here, in Step S214, in the case where it corresponds to everyday discharge tendency, the charging capacity setting section 2183 does nothing. Accordingly, the charging capacity remains to be set to the restricted charging capacity. Then, the normal charging is executed (S216), and charging is continued until reaching the restricted charging capacity (S218).

On the other hand, in Step S214, in the case where it does not correspond to everyday discharge tendency, that is, in the case where discharging is performed more than every day, the charging capacity setting section 2183 sets the charging capacity to a maximum charging capacity. Then, the normal charging is executed (S220), and charging is continued until reaching the maximum charging capacity (S222).

Note that, here, in the normal charging execution steps of Step S216 and Step S220, a step is included in which the charging current setting section 2188 sets the normal charging current in the charging section 216.

[2-4. Examples of Effects]

With the use of the above-mentioned electronic device 200 according to the second embodiment of the present invention, the following effects can be obtained in addition to the effects described in the first embodiment.

The deterioration of the secondary battery caused by the charging current can be suppressed, and in addition, the deterioration of the secondary battery caused by repeating the charging/discharging in near maximum charging capacity can also be suppressed. At this time, in order to deal with an unexpected situation, it can be considered that the charging capacity is temporarily increased, and, in doing so, the charging history information can be used. With the use of the charging history information, in the case where charging is started during everyday charging time period, the control section is capable of performing control such that charging is performed up to the restricted charging capacity even when the discharge is large.

3. Third Embodiment

In the first embodiment and the second embodiment described above, there has been described the electronic device which controls charging of the secondary battery which is built into the electronic device. In a third embodiment, description will be made on the example in which the secondary battery is not built into the apparatus controlling charging. Note that, in the description below, an electronic device 400 differs from the second embodiment only in that the charging control performed by a control section inside the electronic device 400 is changed to the charging control performed by a charging control apparatus 500 which is placed outside and connected thereto via an interface section 420. Hereinafter, description will be mainly made on the differences.

[3-1. Outline of Charging Control Apparatus]

Figure 11:
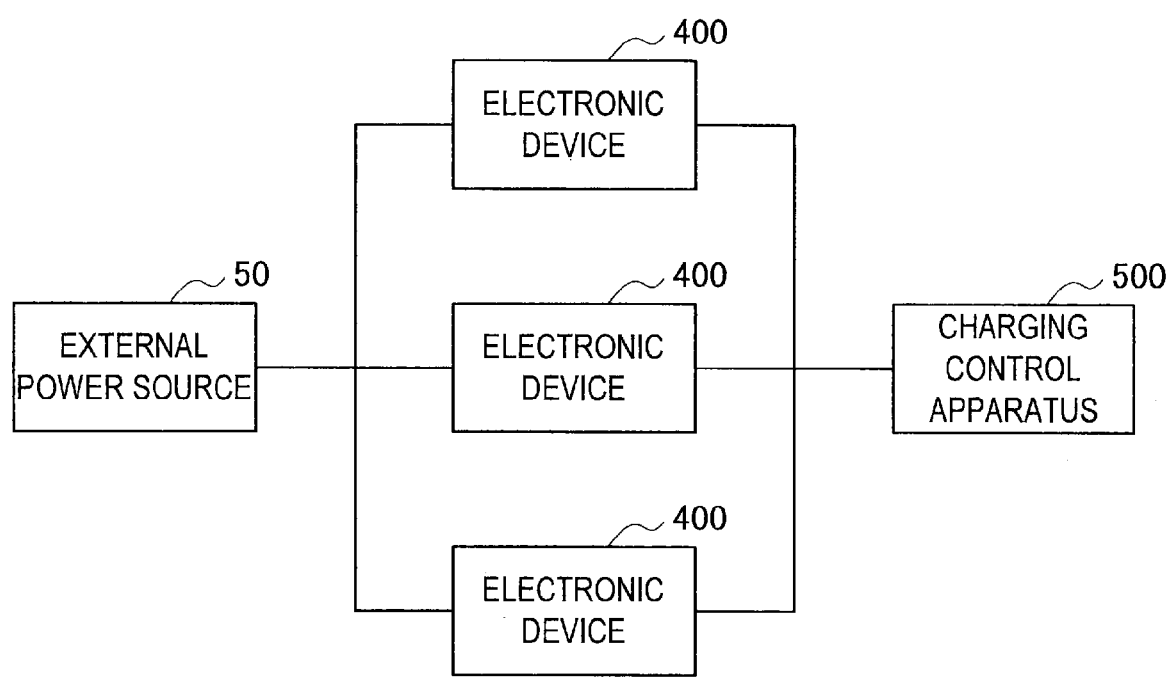
FIG. 11 is an explanatory diagram of a charging control apparatus according to a third embodiment of the present invention.

Referring to FIG. 11, the charging control apparatus 500 according to the third embodiment of the present invention has a function of controlling charging of a secondary battery built into the electronic device 400. The electronic device 400 charges the built-in secondary battery using power supplied from an external power source 50, in accordance with the control of the charging control apparatus 500. In this case, the charging control apparatus 500 can control charging of the secondary batteries built into one or two or more electronic devices 400.

Figure 12:
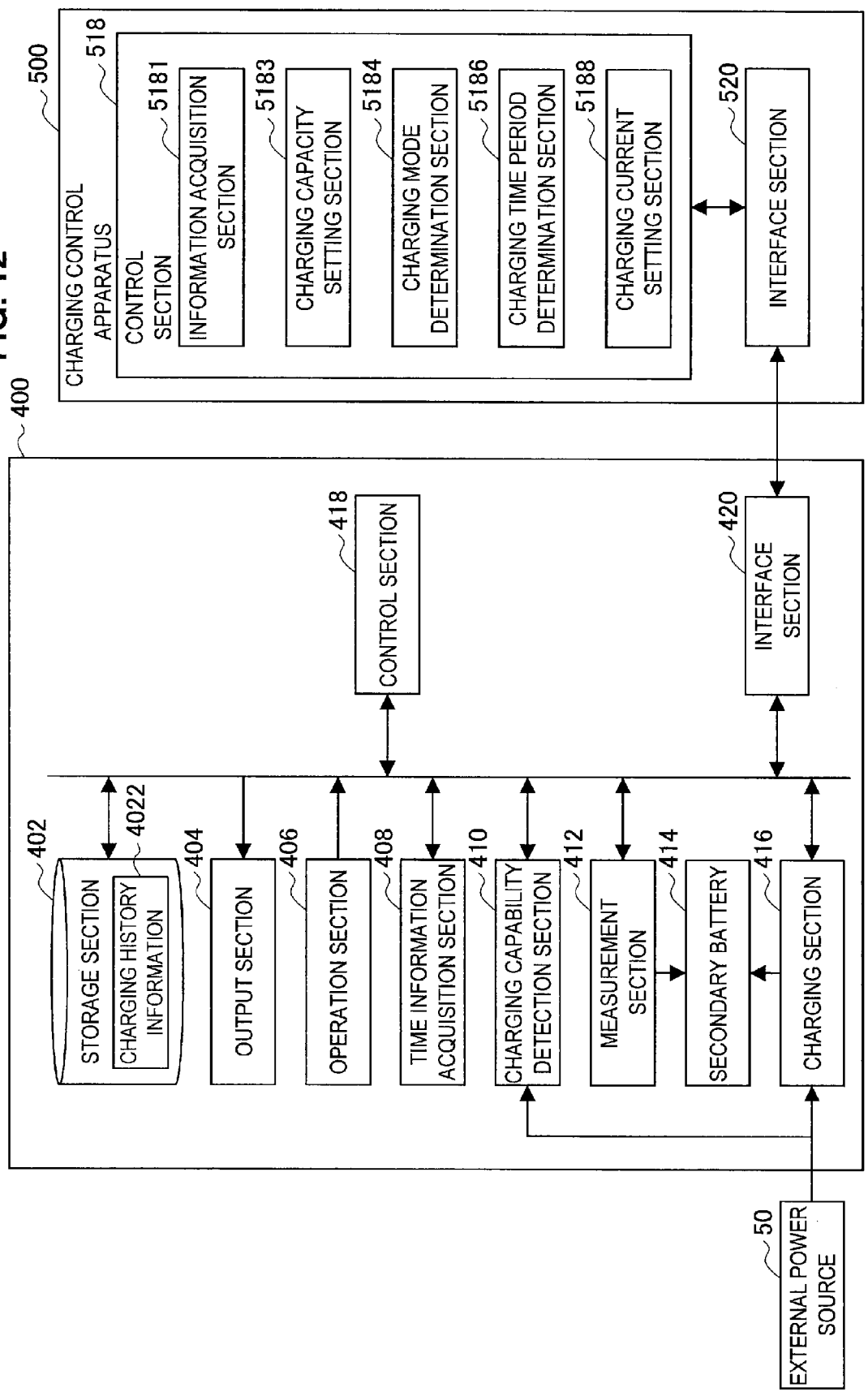
FIG. 12 is a block diagram showing a configuration of the charging control apparatus according to the third embodiment of the present invention.

Next, referring to FIG. 12, the charging control apparatus 500 is connected to the electronic device 400 via an interface section 520, and controls charging of a secondary battery 414 built into the electronic device 400. The charging control apparatus 500 acquires information on charging and discharging of secondary battery 414 from the electronic device 400, and determines the charging time period and the charging current of the secondary battery 414 based on the acquired information. A configuration for realizing such a function will be described next.

[3-2. Configuration of Charging Control Apparatus]

The charging control apparatus 500 is an apparatus having a function of controlling the charging of the secondary battery 414 built into the electronic device 400. The charging control apparatus 500 mainly includes a control section 518 and the interface section 520.

(Control Section: 518)

The control section 518 has a function of controlling entire operation of the charging control apparatus 500. For example, the control section 518 is realized by a CPU and the like. The control section 518 functions as an information acquisition section 5181, a charging capacity setting section 5183, a charging mode determination section 5184, a charging time period determination section 5186, and a charging current setting section 5188, and also has a function as a charging control section which controls entire operation of each of those functions.

(Information Acquisition Section: 5181)

The information acquisition section 5181 has a function of acquiring information for controlling charging of the secondary battery 414, that is, information on charging and discharging of the secondary battery 414. The information acquisition section 5181 can acquire the information on charging and discharging containing charging history information 4022 from the electronic device 400. Further, the information acquisition section 5181 may acquire not only the information on charging and discharging of the intended secondary battery 414, but also information from another electronic device 400 or various types of devices on the network. Here, the "information on charging and discharging of the secondary battery" that the information acquisition section 5181 acquires may include history information of charging and discharging of the secondary battery, information on usage history of the electronic device driven by the secondary battery, information of the amount of charge of the secondary battery, or plan information on charging and discharging of the secondary battery. For example, in the case where the electronic device 400 is an electric vehicle, information of a plan of going out which is registered in a PC of the user of the electric vehicle may become the information on charging and discharging. That is, the information on charging and discharging of the secondary battery may include schedule information on the user of the electronic device driven by the secondary battery.

Further, the information acquisition section 5181 may acquire information on power supply used for charging the secondary battery. For example, the information on power supply used for charging the secondary battery may be information of a priority time period which is preferentially used for charging the secondary battery. In Japan, nighttime electricity prices are cheaper than daytime electricity prices. Accordingly, by setting the night time as the priority time period, charging can be performed at cheaper electricity prices. Further, in the case where there are a plurality of power supply means, the information acquisition section 5181 may acquire information on types thereof and information on the amounts of power supply thereof. For example, in recent years, facilities for solar power generation have been widespread, and information on the amount of power generated by the solar power generation may be acquired.

(Charging Capacity Setting Section: 5183)

The charging capacity setting section 5183 has a function of estimating the amount of discharge up to when the secondary battery 414 is charged next based on the information acquired by the information acquisition section 5181, and setting the charging capacity to a restricted charging capacity, which is restricted, in accordance with the estimated amount of discharge. In the case where the restricted charging capacity is set, the control section 518 terminates charging when the amount of charge of the secondary battery 414 reaches the restricted charging capacity.

(Charging Mode Determination Section: 5184)

At the start time of charging, the charging mode determination section 5184 has a function of determining which of the charging modes is to be used: a normal charging mode using a predetermined normal charging current; or a slow charging mode using the calculated restricted charging current. The charging mode is determined based on any one of the amount of charge of the secondary battery 414, the charging history information 4022, or operation information of the user.

(Charging Time Period Determination Section: 5186)

The charging time period determination section 5186 has a function of determining a charging time period in which the secondary battery 414 is charged based on the information acquired by the information acquisition section 5181. The charging time period determination section 5186 has, in addition to the function of the chargeable time estimation section 1186 according to the first embodiment, a function of determining a time period during this chargeable time in which charging is actually performed. That is, the charging time period determination section 5186 determines the charging time period from the time period in which the secondary battery 414 and a charging section 416 are connected to each other, the time period being estimated based on the charging history information. In particular, in the case where there are a plurality of secondary batteries 414, the chargings of which are to be controlled by the charging control apparatus 500, there is a case where it is not preferred to use the entire chargeable time for charging the said secondary battery 414. Accordingly, the charging time period determination section 5186 can determine the charging time period from the chargeable time. In this case, the charging time period determination section 5186 can determine the charging time period for each secondary battery 414 based on the information on charging and discharging of each of the plurality of secondary batteries 414. Alternatively, the charging time period determination section may determine the charging time period based on information on supply of power that the secondary battery 414 is to be charged with. For example, in the case where the above-mentioned nighttime electricity prices are cheaper than the daytime electricity prices, the charging time period determination section 5186 may set, among the chargeable time, the priority time period in which the nighttime electricity prices are applied as the charging time period.

(Charging Current Setting Section: 5188)

The charging current setting section 5188 has a function of setting the charging current to be used for charging the secondary battery 414 in the charging section 416. The charging current setting section 5188 may directly set the charging current in the charging section 416, or may set the charging current in the charging section 416 by transmitting a message that requires a control section 418 of the electronic device 400 to set the charging current. The charging current setting section 5188 calculates a restricted charging current with which the charging is performed up to charging capacity within the charging time period determined by the chargeable time period determination section 5186, and sets this restricted charging current in the charging section 416, as the charging current with which the secondary battery 414 is charged. In the case where the charging control apparatus 500 controls the chargings of the plurality of secondary batteries 414, the charging current setting section 5188 may determine the restricted charging current such that the totals of the charging currents for the plurality of secondary batteries are smoothed. Further, the charging current setting section 5188 may determine the charging current based on the information on supply of power that the secondary battery 414 is to be charged with.

(Interface Section: 520)

The interface section 520 is an interface for the charging control apparatus 500 to be connected to an external apparatus. For example, the interface section 520 may be an interface to be connected to the interface section 420 of the electronic device 400 through a cable. Alternatively, the interface section 520 may also be a wired or wireless communication interface for performing communication with an external apparatus.

[3-3. Examples of Effects]

When the charging control apparatus 500 according to the third embodiment described above is connected to the plurality of electronic devices 400 each including the secondary battery 414, the charging control apparatus 500 can control the charging of each secondary battery 414. In this case, each charging is controlled based on not only the information on charging and discharging of each secondary battery 414, but also based on the information on charging and discharging of another apparatus.

4. Fourth Embodiment

Next, with reference to FIG. 13 and FIG. 14, a charging control apparatus 600 according to a fourth embodiment of the present invention will be described.

[4-1. Outline of Charging Control Apparatus]

Figure 13:
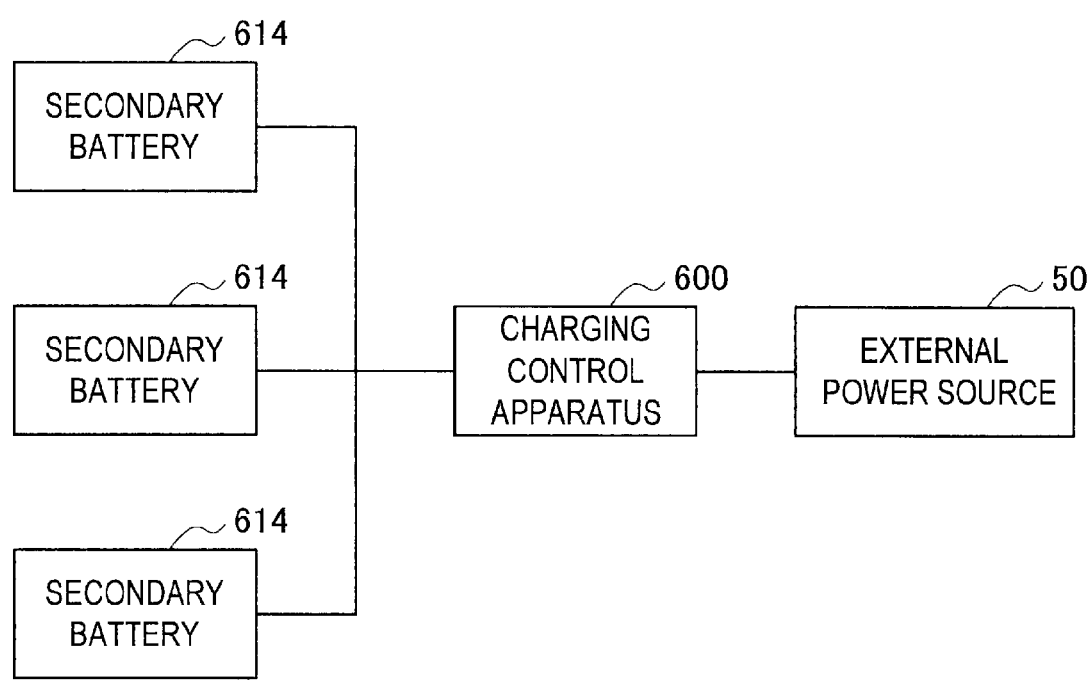
FIG. 13 is an explanatory diagram of a charging control apparatus according to a fourth embodiment of the present invention.

Referring to FIG. 13, the charging control apparatus 600 is connected to one or two or more secondary batteries 614, and has a function of controlling the charging of the secondary battery 614 with the power supplied from an external power source 50.

[4-2. Configuration of Charging Control Apparatus]

Figure 14:
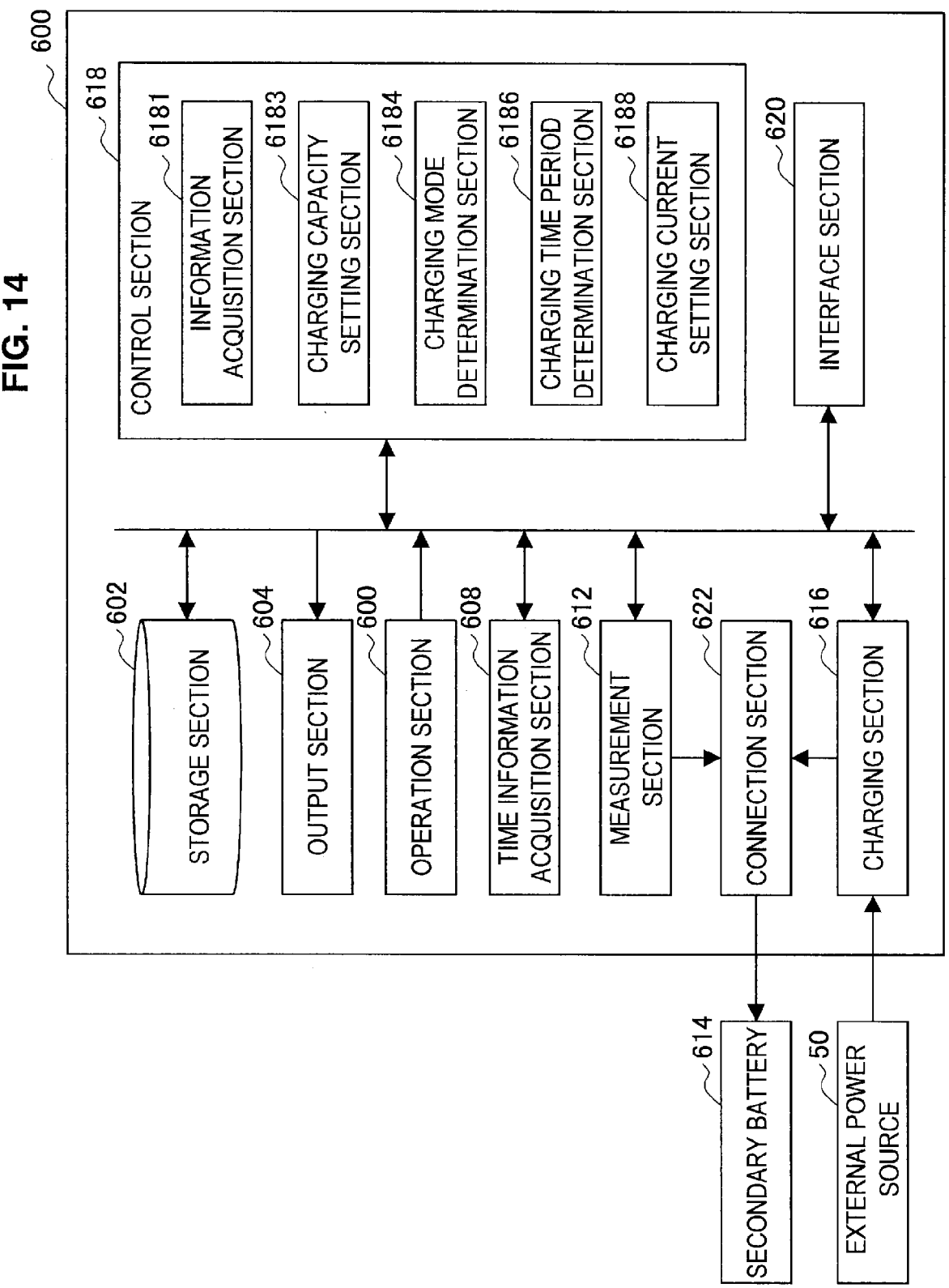
FIG. 14 is a block diagram showing a configuration of the charging control apparatus according to the fourth embodiment of the present invention.

Referring to FIG. 14, the charging control apparatus 600 mainly includes a storage section 602, an output section 604, an operation section 600, a time information acquisition section 608, a measurement section 612, a connection section 622, a charging section 616, a control section 618, and an interface section 620.

Of those, the detailed descriptions on the functions of the storage section 602, the output section 604, the operation section 600, the time information acquisition section 608, the measurement section 612, and the charging section 616 will be omitted, since they are the same as the functions described in the first embodiment. Further, as for each function of the control section 618 which is the same as that of the control section 518 of the third embodiment, the detailed description will also be omitted. Hereinafter, description will be mainly made on the differences.

(Connection Section: 622)

The connection section 622 has a function of connecting the secondary battery 614 to the charging control apparatus 600. The connection section 622 has a role as a terminal that electrically connects the secondary battery 614 to the charging control apparatus 600.

The measurement section 612 can measure an amount of charge, which is the amount of power that the secondary battery 614 is charged with, via the connection section 622. Further, the charging section 616 can charge the secondary battery 614 with the power supplied from the external power source 50 via the connection section 622.

(Information Acquisition Section: 6181)

An information acquisition section 6181 has a function of acquiring information for the charging control of the secondary battery 614. The information acquisition section 6181 can acquire information about inside of the charging control apparatus 600, or information about outside of the charging control apparatus 600 which can be acquired by the interface section 620. Specific examples of the information acquired by the information acquisition section 6181 are the same as the pieces of information acquired by the information acquisition section 5181 described in the third embodiment.

[4-3. Examples of Applications]

Figure 15:
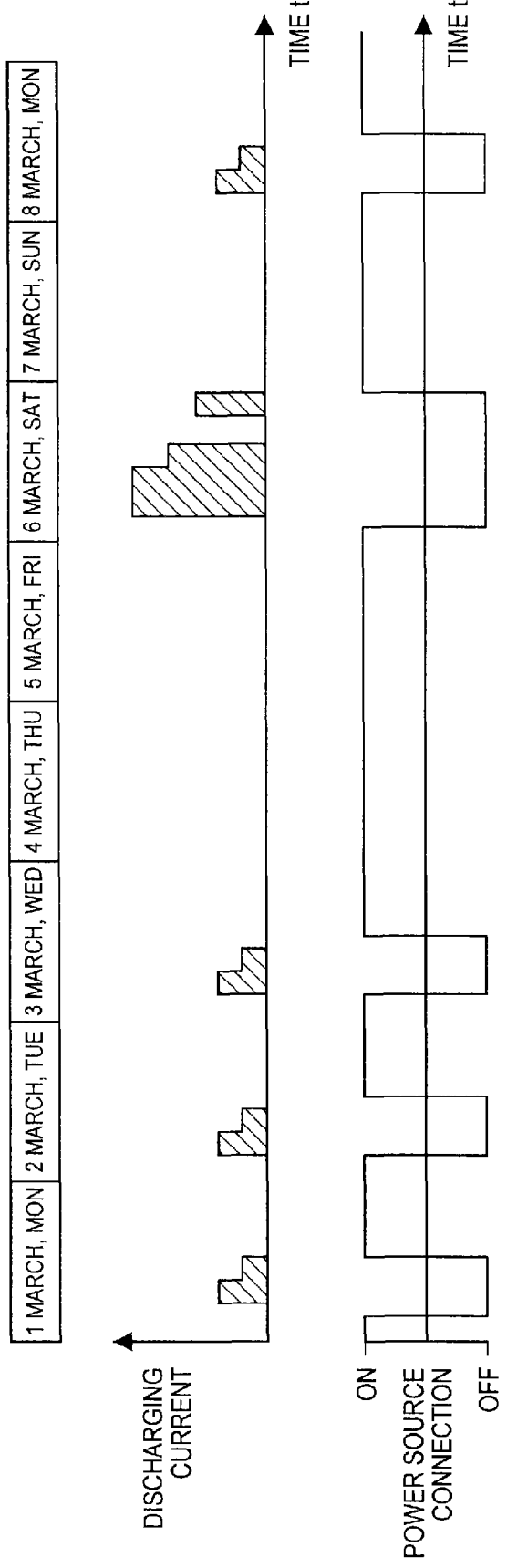
FIG. 15 is an explanatory diagram of charging control when a secondary battery drives an electric vehicle.

Next, specific examples of the charging control of the charging control apparatus 600 will be described with reference to FIG. 15 and FIG. 16. FIG. 15 is an explanatory diagram showing an example of information used for the charging control in the case where the secondary battery 614 to be charged is used in an electric vehicle.

The upper part of FIG. 15 shows a driving history of the electric vehicle from March 1st to March 8th in relation to the discharging current value and the time. Note that the driving history is shown as the discharging current here, but is not limited thereto. For example, information of driving distance may be used. Further, the lower part of FIG. 15 shows information of ON/OFF of the power source connection to the electric vehicle.

For example, as for the part having some habit in the discharging history information, the connection time period with the power source, the driving history, and the like, the control section 618 can perform control by a charging capacity setting section 6183 such that the deterioration is suppressed by performing charging with necessary capacity. For example, as the result of continuously acquiring the data of FIG. 15, in the case where there are habits that the user of the electric vehicle only drives about 10 km per day from Monday to Wednesday every week, and does not use the electric vehicle on Thursdays and Fridays, the control may be performed, from Mondays to Wednesdays, such that the charging may be performed with capacity that is only enough for driving about 10 km. Further, as for Thursdays and Fridays, since there is the habit that the electric vehicle is not used, the control can be performed, during those periods, such that the charging is preferentially performed during the time period in which nighttime power and power obtained by solar power generation can be used.

Further, in the case where it can be estimated that long-distance driving is to be performed on the weekend, for example, in the case where the information indicating that long-distance driving is habitually often performed on Saturdays is obtained based on driving history information, or, in the case where the information indicating that driving of a long distance is obtained based on information of a scheduler of a PC or a navigation apparatus of the user, the control section 618 may perform control such that the charging is performed up to the full charging capacity. Alternatively, those determinations may be performed by operation of the user. Further, in the case where it can be estimated that long-distance driving is to be performed on the weekend, and in the case where the electric vehicle is not connected to the power source, the control section 618 may perform alert notification to the user. There may be used the following method as this notification: playing sound, displaying a message on a screen, or sending an e-mail to an e-mail address of a registered user.

Further, this charging control can be also applied to the charging of a household battery, an intermediate battery, and the like, which are required in the smart-grid technology. The charging control apparatus 600 may determine the charging current and the charging time of each battery based on the information on charging and discharging of the battery. Alternatively, the charging control apparatus 600 calculates the amount of power that should be accumulated in each of the household battery and the intermediate battery based on history information of the consumption amount of power to be supplied to beyond the household battery and the intermediate battery, thereby being capable of performing charging efficiently in a condition with less load on the batteries.

For example, in charging three batteries, batteries A to C, the charging control apparatus 600 generalizes profiles of the respective batteries, and can perform control such that charging to the respective batteries is distributed in a manner that the powers at the power transmission side are smoothed. In a state in which it is estimated that dischargings of the batteries A to C are performed as shown in (a) to (c) of FIG. 16, the control section 618 can determine the charging time period of the respective batteries as shown in FIG. 16. In this case, a charging time period estimation section 6186 of the control section 618 completes charging until discharging of each battery is started, and may determine the charging time period in such a manner that chargings to the respective batteries is distributed, that is, in the example shown in FIG. 16, in such a manner that all the charging time periods of the three batteries A to C are not overlapped.

For example, in the case where many robots each operating with a secondary battery mounted thereon are used in a factory, the charging control apparatus 600 can create a profile from the usage state and the usage frequency of each robot, and can perform control such that charging which matches the usage situation is executed. At that time, in order that the load at the intermediate battery side can be made uniform, in the case where operations of specific devices are overlapped with each other, a feedback of information can be performed from the intermediate battery side so that the operations of the respective devices are not overlapped, in a manner to separate those.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the embodiments described above, when the start time of charging corresponds to the everyday charging time period, the slow charging is always performed, but the present invention is not limited thereto. For example, even when the start time of charging is during the everyday charging time period, in the case where the chargeable time is short and the restricted charging current becomes larger than the normal charging current, the normal charging may be performed.

Further, for example, in the embodiments described above, the estimation of the chargeable time is performed using the charging history information, but is not limited thereto. For example, in the case where an electronic device has an alarm function, alarm time may be used in addition to the charging history information. For example, the alarm time may be used for estimating the end time of the chargeable time.

Further, for example, the embodiments described above have a form in which the message that gives the notification of the charging mode and the estimated time of charging termination is displayed on the screen, and the charging mode switching operation can be performed by clicking the message, but are not limited thereto. For example, the user may be notified of the charging mode by varying the battery display between the normal charging mode and the slow charging mode. Further, the notification of the charging mode is not limited to the screen display, but may be performed using a light emitting device such as an LED. As for the switching of the charging mode, a dedicated button may be provided, or a switch menu may be fitted into a setup menu.

Further, for example, in the second embodiment described above, the feedback to the chargeable time calculation algorithm described in the first embodiment is omitted for simplicity of the description, but may of course be applied to the second embodiment.

Further, in the second embodiment described above, in the case of not corresponding to the everyday charging time period, and also, in the case of differing from the everyday discharge tendency, the charging capacity is to be set to the maximum charging capacity, but the present invention is not limited to such an example. For example, even when it is the everyday charging time period, in the case of differing from the everyday discharge tendency, the charging capacity may be set to the maximum charging capacity. Further, it may not necessarily be the maximum charging capacity to which the charging capacity is increased, as long as the value is enough for using the electronic device.

Further, in the embodiments described above, the estimation of the time period connected to the external power source is performed, but the estimation may be performed by obtaining the statistics of the time period connected to a cradle. In addition, there can be considered the following utilization: the estimation is performed by obtaining the statistics of the time period used by the user, and, in the case of executing applications requiring high processing ability such as a virus scan and defragmentation, they are executed in the time period not used by the user.

Still further, in the embodiments described above, the algorithm for creating the charging history information uses Equation 1, but is not limited thereto. For example, it can be considered to use various algorithms such as a calculation method using a standard deviation, for example.

Further, in the embodiments described above, the example of the method of acquiring the charging history every hour is shown, but the embodiments are not limited thereto. For example, the acquisition may be performed every 10 minutes, or every 30 minutes, and can be designed appropriately.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps processed in the chronological order, the order of the steps may be changed appropriately according to circumstances.

REFERENCE SIGNS LIST

100 Electronic device
102, 202 Storage section
104, 204 Output section
106, 206 Input section
108, 208 Time information acquisition section
110, 210 Charging capability detection section
112, 212 Measurement section
114, 214 Secondary battery
116, 216 Charging section
118, 218 Control section
1182, 2182 Charging history information creation section
1184, 2184 Charging mode determination section
1186, 2186 Chargeable time estimation section
1188, 2188 Charging current setting section
2181 Discharging history information creation section
2183 Charging capacity setting section

The invention claimed is:

1. An electronic device comprising:
a secondary battery capable of being charged repeatedly;
a charging section which charges the secondary battery with power supplied from an external power supply section with a set charging current;
a measurement section which measures an amount of charge accumulated in the secondary battery;
a time information acquisition section which acquires time information;
a storage section which stores charging history information created from data of a time period in which a user performs charging;
a charging capability detection section which detects whether it is a state in which charging is possible from the power supply section, by transmitting a state notification signal that performs notification of detecting connection and disconnection to the power supply section; and
a control section which has a discharging history information creation section which, when receiving the state notification signal, causes the measurement section to measure an amount of charge, and creates and stores in the storage section discharging history information based on the amount of charge, a charging capacity setting section which sets a charging capacity to a restricted charging capacity, which is restricted, based on the discharging history information, a chargeable time estimation section that estimates chargeable time based on the charging history information and the time information, and a charging current setting section that calculates a restricted charging current which enables the secondary battery to be charged up to the restricted charging capacity within the chargeable time, based on the amount of charge acquired from the measurement section, and sets the restricted charging current in the charging section,
wherein the charging history information is expressed as a plurality of discrete charging histories corresponding to respective pre-set times of day and indicating, for each of the pre-set times, whether a connection state of the external power supply section is detected at the pre-set time, each discrete charging history being updated according to an equation that expresses the discrete charging history as a function of a prior discrete charging history.

2. The electronic device according to claim 1,
wherein the control section further includes a charging history information creation section which causes the charging capability detection section to acquire charging capability information every of the pre-set times of day, and creates and stores in the storage section charging history information based on the charging capability information.

3. The electronic device according to claim 1,
wherein the control section further includes a charging mode determination section which determines, based on at least one of the amount of charge or the charging history information, which of the charging modes is to be used, a normal charging mode using a predetermined normal charging current, or a slow charging mode in which a restricted charging current is set based on the amount of charge and the chargeable time, and wherein, in a case where the charging mode determination section determines to use the normal charging mode, the charging current setting section sets the normal charging current in the charging section, and in a case where the charging mode determination section determines to use the slow charging mode, the charging current setting section calculates the restricted charging current and sets the restricted charging current in the charging section.

4. The electronic device according to claim 3, further comprising:
a display section which displays the charging mode and an estimated time of charging termination, which is a time at which the chargeable time terminates; and
an input section which inputs operation information corresponding to an operation of a user to the control section,
wherein, in a case where the operation information is input, the charging mode setting section sets the charging mode in accordance with the operation information, regardless of the amount of charge and the charging history information.

5. The electronic device according to claim 1,
wherein, based on the discharging history information, in a case of not corresponding to an everyday charging time period and differing from everyday discharge tendency, the charging capacity setting section sets the restricted charging capacity, which is restricted, to be increased.

6. The electronic device according to claim 1,
wherein, in a case of not corresponding to an everyday charging time period or in a case where the amount of charge is equal to or less than a threshold, the charging current setting section sets a predetermined normal charging current, which is larger than the restricted charging capacity, in the charging section.

7. A method of charging an electronic device including a secondary battery capable of being charged repeatedly, a charging section which charges the secondary battery with power supplied from an external power supply section with a set charging current, a measurement section which measures an amount of charge accumulated in the secondary battery, a time information acquisition section which acquires time information, a storage section which stores charging history information indicating a time period in which a user performs charging, and a charging capability detection section which detects whether it is a state in which charging is possible from the power supply section, by transmitting a state notification signal that performs notification of detecting connection and disconnection to the power supply section, the method comprising:
causing the measurement section to measure an amount of charge, and creating and storing in the storage section discharging history information based on the amount of charge, when the state notification signal is received;
setting a charging capacity to a restricted charging capacity, which is restricted, based on the discharging history information;
estimating chargeable time based on the charging history information and the time information;
calculating a restricted charging current which enables the secondary battery to be charged up to the restricted charging capacity within the chargeable time;
setting the restricted charging current in the charging section; and
charging, by the charging section, the secondary battery with the set restricted charging current, wherein the charging history information is expressed as a plurality of discrete charging histories corresponding to respective pre-set times of day and indicating, for each of the pre-set times, whether a connection state of the external power supply section is detected at the pre-set time, each discrete charging history being updated according to an equation that expresses the discrete charging history as a function of a prior discrete charging history.

8. A non-transitory storage medium on which is recorded a program for causing a computer to function as an electronic device which includes
a secondary battery capable of being charged repeatedly,
a charging section which charges the secondary battery with power supplied from an external power supply section with a set charging current,
a measurement section which measures an amount of charge accumulated in the secondary battery,
a time information acquisition section which acquires time information,
a storage section which stores charging history information created from data of a time period in which a user performs charging,
a charging capability detection section which detects whether it is a state in which charging is possible from the power supply section, by transmitting a state notification signal that performs notification of detecting connection and disconnection to the power supply section, and
a control section which has a discharging history information creation section which, when receiving the state notification signal, causes the measurement section to measure an amount of charge, and creates and stores in the storage section discharging history information based on the amount of charge, a charging capacity setting section which sets a charging capacity to a restricted charging capacity, which is restricted, based on the discharging history information, a chargeable time estimation section that estimates chargeable time based on the charging history information and the time information, and a charging current setting section that calculates a restricted charging current which enables the secondary battery to be charged up to the restricted charging capacity within the chargeable time, based on the amount of charge acquired from the measurement section, and sets the restricted charging current in the charging section,
wherein the charging history information is expressed as a plurality of discrete charging histories corresponding to respective pre-set times of day and indicating, for each of the pre-set times, whether a connection state of the external power supply section is detected at the pre-set time, each discrete charging history being updated according to an equation that expresses the discrete charging history as a function of a prior discrete charging history.

9. A charging control apparatus comprising:
an information acquisition section which acquires charging history information and discharging history information of a secondary battery;
a charging time period determination section which determines a charging time period in which the secondary battery is charged based on the information acquired by the information acquisition section; and
a charging current setting section which calculates a restricted charging current with which charging is performed up to a charging capacity within a charging time period determined by the charging time period determination section, and sets power supplied from a power supply section in a charging section that charges the secondary battery, as a charging current with which the secondary battery is charged, wherein the charging history information is expressed as a plurality of discrete charging histories corresponding to respective pre-set times of day and indicating, for each of the pre-set times, whether a connection state of the external power supply section is detected at the pre-set time, each discrete charging history being updated according to an equation that expresses the discrete charging history as a function of a prior discrete charging history.

10. The charging control apparatus according to claim 9,
wherein the charging time period determination section determines the charging time period from a time period in which the secondary battery and the charging section are connected to each other, the time period being estimated based on the charging history information, and
wherein the charging current setting section sets, in the charging section, a restricted charging current which makes an amount of charge of the secondary battery to become the charging capacity within the charging time period.

11. The charging control apparatus according to claim 9,
wherein the information acquisition section acquires pieces of charging history information and pieces of discharging history information of a plurality of the secondary batteries,
wherein the charging time period determination section determines, based on the pieces of charging history information and the pieces of discharging history information of the plurality of secondary batteries, respective charging time periods of the secondary batteries, and
wherein the charging current setting section sets the restricted charging current that makes totals of the charging currents of the plurality of secondary batteries smooth.

12. The charging control apparatus according to claim 9, further comprising
a charging capacity setting section which estimates an amount of discharge up to when the secondary battery is charged next based on the discharging history information acquired by the information acquisition section, and sets the charging capacity to a restricted charging capacity, which is restricted, in accordance with the estimated amount of discharge.

13. The charging control apparatus according to claim 9,
wherein the information acquisition section further acquires schedule information on a user of an electronic device driven by the secondary battery.

14. The charging control apparatus according to claim 9,
wherein the charging time period determination section and the charging current setting section determines the charging time period and the charging current based on information on supply of power that the secondary battery is charged with.

15. The charging control apparatus according to claim 14,
wherein the information on supply of power includes information of a priority time period which is preferentially used for charging the secondary battery.

16. The charging control apparatus according to claim 9,
wherein the secondary battery drives an electric vehicle, and
wherein the information acquisition section further acquires driving history information of the electric vehicle.

17. A charging control method realized by causing arithmetic processing means of a charging control apparatus controlling charging of a secondary battery to execute predetermined procedures comprising:
acquiring charging history information and discharging history information of the secondary battery;
determining a charging time period in which the secondary battery is charged based on the information acquired in the information acquisition step; and
calculating a restricted charging current with which charging is performed up to a charging capacity within the determined charging time period, and setting power supplied from a power supply section in a charging section that charges the secondary battery, as a charging current with which the secondary battery is charged,
wherein the charging history information is expressed as a plurality of discrete charging histories corresponding to respective pre-set times of day and indicating, for each of the pre-set times, whether a connection state of the external power supply section is detected at the pre-set time, each discrete charging history being updated according to an equation that expresses the discrete charging history as a function of a prior discrete charging history.

18. An electronic device comprising:
a secondary battery capable of being charged repeatedly;
a charging section which charges the secondary battery with power supplied from an external power supply section with a set charging current;
a storage section which stores discharging history information and charging history information; and
a control section which sets a charging capacity and a charging current based on the discharging history information and the charging history information,
wherein the charging history information is expressed as a plurality of discrete charging histories corresponding to respective pre-set times of day and indicating, for each of the pre-set times, whether a connection state of the external power supply section is detected at the pre-set time, each discrete charging history being updated according to an equation that expresses the discrete charging history as a function of a prior discrete charging history.

19. The electronic device according to claim 18, further comprising
a time information acquisition section which acquires time information,
wherein the control section sets a charging capacity to a restricted charging capacity, which is restricted, based on the discharging history information, and estimates chargeable time based on the charging history information and the time information.

20. The electronic device according to claim 19, further comprising
a measurement section which measures an amount of charge accumulated in the secondary battery,
wherein the control section calculates a restricted charging current which enables the secondary battery to be charged up to the restricted charging capacity within the chargeable time, based on the amount of charge acquired from the measurement section, and sets the restricted charging current in the charging section.

21. The electronic device according to claim 19, wherein the control section determines a charging mode based on the amount of charge acquired from the measurement section and the charging history information.

22. The electronic device according to claim 19, wherein, in a case where, based on the discharging history information, an amount of discharge is equal to or more than a predetermined threshold, the control section increases the setting of the restricted charging capacity and makes it possible to perform charging up to a maximum charging capacity.

* * * * *